(12) United States Patent
Mansfield et al.

(10) Patent No.: US 12,462,934 B2
(45) Date of Patent: Nov. 4, 2025

(54) DEVICE-INSULATED MONITORING OF PATIENT CONDITION

(71) Applicant: The Regents of the University of California, Oakland, CA (US)

(72) Inventors: Samuel Mansfield, Santa Cruz, CA (US); Katia Obraczka, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 431 days.

(21) Appl. No.: 17/455,317

(22) Filed: Nov. 17, 2021

(65) Prior Publication Data

US 2022/0157455 A1    May 19, 2022

Related U.S. Application Data

(60) Provisional application No. 63/114,674, filed on Nov. 17, 2020.

(51) Int. Cl.
*G16H 40/60* (2018.01)
*A61B 5/00* (2006.01)
(Continued)

(52) U.S. Cl.
CPC ........... *G16H 40/67* (2018.01); *A61B 5/7275* (2013.01); *A61B 5/742* (2013.01); *G16H 50/30* (2018.01)

(58) Field of Classification Search
CPC ...... A61B 5/742; A61B 5/7275; G16H 50/30; G16H 40/67
See application file for complete search history.

(56) References Cited

U.S. PATENT DOCUMENTS

| 11,901,059 B2 * | 2/2024 | Pugsley | ............. A61J 7/0084 |
| 12,064,209 B2 * | 8/2024 | Nazari | ............. A61B 5/002 |

(Continued)

FOREIGN PATENT DOCUMENTS

| WO | WO-2014009876 A2 * | 1/2014 | ......... G06F 19/3468 |
| WO | WO-2014100571 A2 * | 6/2014 | ......... G06F 19/3418 |

OTHER PUBLICATIONS

Cannady. A study on the efficiency of encryption algorithms for wireless sensor networks. Doctor of Professional Studies in Computing. Pace University. Sep. 2019. (Year: 2019).*

(Continued)

*Primary Examiner* — Christopher L Gilligan
*Assistant Examiner* — Tristan Isaac Evans
(74) *Attorney, Agent, or Firm* — SCHWEGMAN LUNDBERG & WOESSNER, P.A.

(57) ABSTRACT

Techniques monitoring and preventing a patient conditions include a sensing module, a storage module, an analysis module and a visualization module. The sensing module receives, from a sensor, samples that indicate measurements suitable for a condition of a patient and storing sample data in a local buffer. The storage module is configured to receive a sample data packet indicating sample type, patient identifier, device identifier, timestamp, and sample value, and to store them into a sample data structure. The analysis module is configured to determine a metric based on the sample value, and to store into that into a metric data structure metric type, patient identifier, device identifier, timestamp, and metric value. The visualization module is configured to present the sample or the metric on a display device configured to be viewed by a caregiver for the patient.

6 Claims, 21 Drawing Sheets

(51) Int. Cl.
  *G16H 40/67* (2018.01)
  *G16H 50/30* (2018.01)

(56) References Cited

U.S. PATENT DOCUMENTS

| | | | | |
|---|---|---|---|---|
| 2012/0276894 | A1* | 11/2012 | Kai | G16H 40/67 455/422.1 |
| 2018/0277242 | A1* | 9/2018 | Zhong | A61B 5/1112 |
| 2019/0117070 | A1* | 4/2019 | Muhsin | A61B 5/0295 |
| 2024/0211243 | A1* | 6/2024 | Housel | G06F 8/65 |

OTHER PUBLICATIONS

Pandian. Wireless Sensor Network for Wearable Physiological Monitoring. Journal of Networks, vol. 3, No. 5, May 2008. (Year: 2008).*

Hill, Jason. System Architecture directions for networked sensors. Acm Sigplan Notices, vol. 35, Issue 11, pp. 93-104. Nov. 1, 2000. (Year: 2000).*

Otto, Chris. System Architecture of a wireless body area sensor netwrk for ubiquitous health monitoring. vol. 1 Iss. 4 Journal of Mobile Multimedia. 2006. (Year: 2006).*

Bader, D. L., et al., "Technologies to monitor the health of loaded skin tissues", BioMedical Engineering OnLine, Apr. 12, 2018, 19 pages.

Baljak, V., et al., "A scalablerealtimeanalyticspipelineandstoragearchitecture for physiologicalmonitoringbigdata", Smart Health, vol. 9-10, Dec. 2018, pp. 275-286.

Curtis, A., et al., "HealthSense: Software-defined Mobile-based Clinical Trials", The 25th Annual International Conference on Mobile Computing and Networking, Aug. 2019, pp. 1-15.

Dunkels, A., et al., "Contiki—a Lightweight and Flexible Operating System for Tiny Networked Sensors", 29th Annual IEEE International Conference on Local Computer Networks, 2004, 8 pages.

Mansfield, S., et al., "Objective Pressure Injury Risk Assessment Using A Wearable Pressure Sensor", 2019 IEEE International Conference on Bioinformatics and Biomedicine (BIBM), 2019, 8 pages.

Mansfield, S., et al., "Pressure Injury Prevention: A Survey", IEEE Reviews in Biomedical Engineering, vol. 13, 2020, 17 pages.

McPadden, J., et al., "A Scalable Data Science Platform for Healthcare and Precision Medicine Research", arXiv:1808.04849, 2018, 7 pages.

Pickham, D., et al., "Effect of a wearable patient sensor on care delivery for preventing pressure injuries in acutely ill adults: A pragmatic randomized clinical trial (LS-HAPI study)", International Journal of Nursing Studies, vol. 80, 2018, pp. 12-19.

Rodriguez, A., et al., "Medical Device Connectivity Challenges Outline the Technical Requirements and Standards For Promoting Big Data Research and Personalized Medicine in Neurocritical Care", Military Medicine, vol. 183, No. 1, March-Apr. 2018, pp. 99-104.

Swisher, S. L., et al., "Impedance sensing device enables early detection of pressure ulcers in vivo" nature communications, Mar. 17, 2015, 10 pages.

Touati, F., et al., "Feasibility and performance evaluation of a 6LoWPAN-enabled platform for ubiquitous healthcare monitoring", Wirel. Commun. Mob. Comput., vol. 16, 2016, pp. 1271-1281.

* cited by examiner

DEVICE-INSULATED MONITORING OF PATIENT CONDITION

CROSS-REFERENCE TO RELATED APPLICATIONS

This application claims benefit of Provisional Appln. 63/114,674, filed Nov. 17, 2020, the entire contents of which are hereby incorporated by reference as if fully set forth herein, under 35 U.S.C. § 119(e).

STATEMENT OF GOVERNMENTAL INTEREST

This invention was made with Government support under Grant No. CNS 1321151, awarded by the National Science Foundation. The Government has certain rights in the invention.

BACKGROUND

Sensor-based patient monitoring is a promising approach to assess risk, which can then be used by healthcare clinics to focus efforts on the highest-risk patients without having to spend the time manually assessing risk. In addition, sensor-based patient monitoring can be tuned to the individual based on the relative sensor readings. However, existing sensor-based monitoring techniques such as pressure monitoring, blood flow monitoring, skin integrity monitoring, as well as visual monitoring using cameras, are one-off solutions that are not supported by a complete system that integrates sensing, data collection, storage, data analysis, and visualization and are strongly dependent on specific suites of monitoring devices.

While each is suitable for its intended purpose, these approaches require substantial re-programming as the suite of monitoring sensors changes.

SUMMARY

Techniques are provided for patient monitoring protocol that insulates major functionality from device dependence, called herein a Monitoring and Prevention (MAP) system. This MAP is simpler than existing technologies and has profound implications for improved simplicity, efficiency, flexibility, and robustness. As used herein, a patient is a human or animal subject whose condition is being monitored by a care provider.

According to a first set of embodiments, a system includes at least one processor; and at least one memory including one or more sequences of instructions, the at least one memory and the one or more sequences of instructions are configured to, with the at least one processor, provide: a sensing module, a storage module, an analysis module and a visualization module. The sensing module is configured to receive, from a sensor, samples that indicate measurements by the sensor suitable for a condition of a patient and storing data indicating values for the samples in a local buffer. The storage module is configured to receive from the sensing module a sample data packet comprising basic fields holding sample data indicating sample type, patient identifier, device identifier, timestamp, and sample value, and to store into a sample data structure the basic fields holding the sample data from the sample data packet. The analysis module is configured to determine a metric based on the sample value, and to store into a metric data structure metric data indicating metric type, patient identifier, device identifier, timestamp, and metric value. The visualization module is configured to present the sample or the metric on a display device configured to be viewed by a care giver for the patient.

In a second set of embodiments, a sensing method executed on a processor includes receiving, from a sensor, samples that indicate measurements by the sensor suitable for a condition of a patient and storing data indicating values for the samples in a local buffer. The method also includes receiving a sampling factor. The method further includes sending to a data store client a sample data packet comprising basic fields holding sample data indicating sample type, patient identifier, device identifier, timestamp, and sample value. The number of sample data packets is based, at least in part, on the sampling factor.

In some embodiments of the second set, the method includes sending a command to the sensor, wherein the command causes the sensor to behave in a manner associated with the command. In some of these embodiments, the method also includes receiving a command packet comprising basic fields holding command data indicating command type, patient identifier, device identifier, timestamp, and command value. The command sent to the sensor is based on values in the command type field and the command value field.

In some embodiments of the second set, the sample value is encrypted.

In a third set of embodiments, a storage method executed on a processor includes retrieving system data that indicates a real-time update period, a sensor rate and a sampling factor. The sensor rate indicates a rate of producing, from a sensor, samples that indicate measurements suitable for a condition of a patient. The sampling factor indicates what fraction of the samples to store for patient monitoring. The method also includes receiving from the sensing server a sample data packet. The sample data packet includes basic fields holding sample data indicating sample type, patient identifier, device identifier, timestamp, and sample value. A number of sample data packets is based, at least in part, on the sampling factor. Still further, the method includes, in response to receiving the data packet with the basic fields, storing in a local sample data structure the basic fields holding the sample data from the sample data packet.

In some embodiments of the third set, the method also includes sending to the sensing server a command packet comprising basic fields holding data indicating command type, patient identifier, device identifier, timestamp, and command value. The sensor is configured to behave in a manner associated with the command type and the command value. In some of these embodiments, the command type and the command value causes the sensor to perform a start, or a stop, or to operate in a particular range, or to operate at a particular sampling rate, or some combination.

In some embodiments of the third set, the sample value is encrypted.

In a fourth set of embodiments, an analysis method executed on a processor includes retrieving system data that indicates a real-time update period and an analysis rate. The analysis rate indicates a rate of deriving a metric from samples that indicate measurements from a sensor suitable for a condition of a patient. When it is time to determine a metric based on the analysis rate, the method still further includes: retrieving from a sample data structure sample data indicating sample type, patient identifier, device identifier, timestamp, and sample value; and determining a metric based on the sample value; and, storing into a metric data structure metric fields holding data indicating metric type, patient identifier, device identifier, timestamp, and metric value.

In some embodiments of the fourth set, the sample value is encrypted and the method even further includes decrypting the sample value. In some embodiments of the fourth set, the metric value is encrypted.

In a fifth set of embodiments, a visualization method executed on a processor includes retrieving system data that indicates a real-time update period and a visualization rate. The visualization rate indicates a rate of presenting, to a caregiver of a patient, a sample that indicates a measurement from a sensor suitable for a condition of the patient or a metric derived from the sample or some combination. When it is time to visualize based on the visualization rate, then, the method includes: retrieving from a sample data structure sample data indicating sample type, patient identifier, device identifier, timestamp, and sample value; or, retrieving from a metric data structure metric data indicating metric type, patient identifier, device identifier, timestamp, and metric value, or some combination. When it is time to visualize based on the visualization rate, then the method also includes presenting the sample or the metric on a display device configured to be viewed by the caregiver for the patient.

In a sixth set of embodiments, a non-transitory computer-readable medium includes a sample data structure and a metric data structure. The sample data structure includes sample data indicating sample type, patient identifier, device identifier, timestamp, and sample value. The metric data structure includes metric data indicating metric type, patient identifier, device identifier, timestamp, and metric value. A sample value indicates a measurement from a sensor suitable for a condition of a patient and the metric value is derived from the sample value.

In other sets of embodiments, a non-transitory computer-readable medium or an apparatus or system is configured to perform one or more steps of one or more of the above methods or to provide data structures to support one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1:
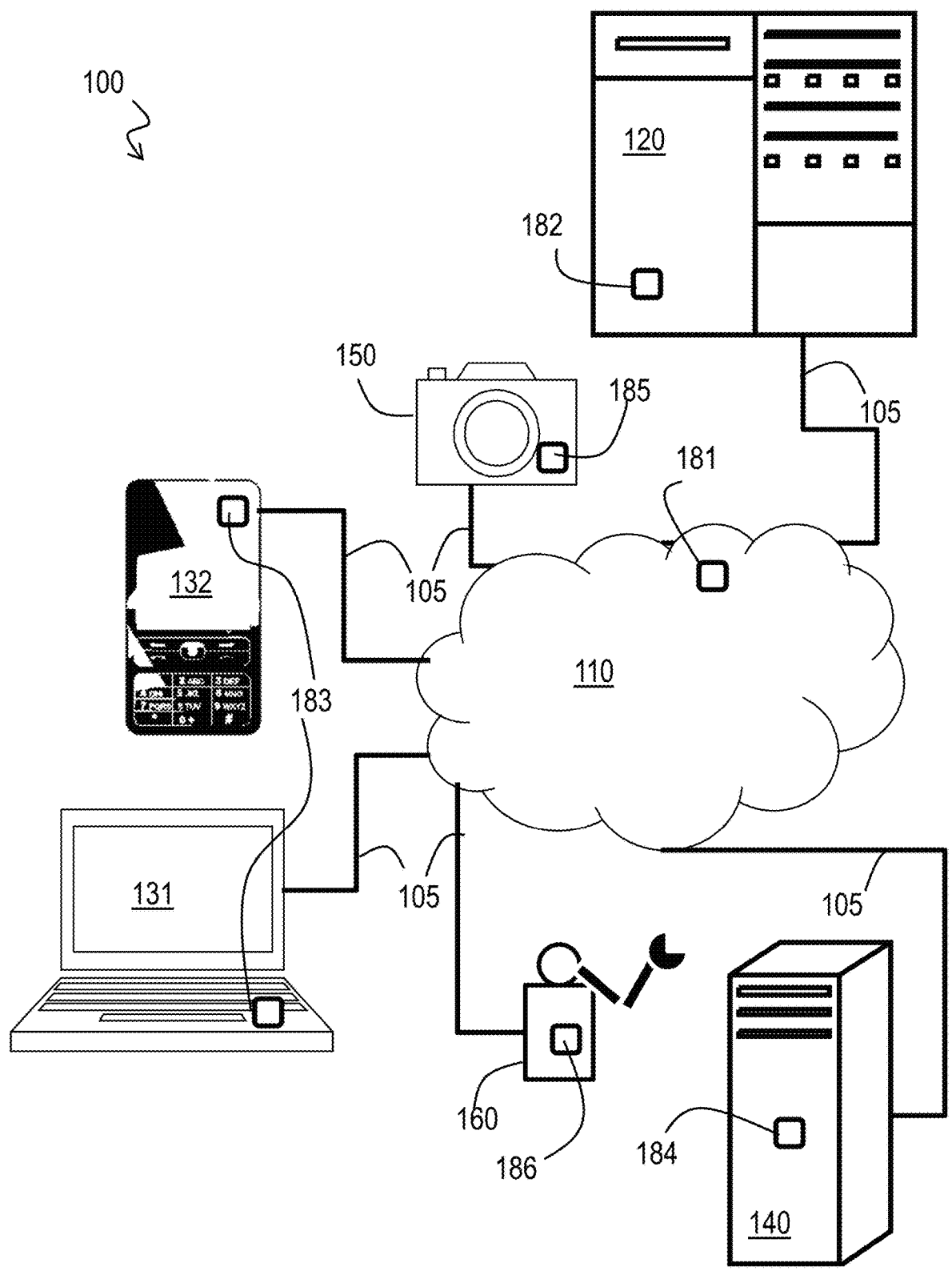
FIG. 1 is a block diagram that illustrates an example cloud-based system, according to an embodiment.

A method and apparatus are described for device-insulated medical monitoring. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. OVERVIEW

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data, called communication packets, or simply "packets," herein. Information is exchanged within packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein. Some protocols pass protocol-related information among two or more network nodes in special control packets that are communicated separately, and which include a payload of information used by the protocol itself rather than a payload of data to be communicated for another protocol or application. These control packets and the processes at network nodes that utilize the control packets are said to be in another dimension, a "control plane," distinct from the "data plane" dimension that includes the packets with payloads for other applications at the end nodes.

The internetwork header (layer 3) provides information defining the source and destination address within the network. Notably, the path may span multiple physical links. The internetwork header may be formatted according to the Internet Protocol (IP), which specifies IP addresses of both a source and destination node at the end points of the logical path. Internet Protocol version 6 (IPv6), provides for more numerous internet addresses. Thus, the packet may "hop" from node to node along its logical path until it reaches the end node assigned to the destination IP address stored in the packet's internetwork header.

The transport header (layer 4) provides information defining the relationship between one or more packets used for exchanging data between application programs executing on the end nodes; and ensures all the data to be transmitted by the application program on one end node is received by the application program other end node. The best-known transport protocol of the Internet Protocol suite is the Transmission Control Protocol (TCP). It is used for connection-oriented transmissions, whereas the connectionless User Datagram Protocol (UDP) is used for simpler messaging transmissions. TCP is the more complex protocol, due to its stateful design incorporating reliable transmission and data stream services. Together, TCP and UDP comprise essentially all traffic on the internet and are the only protocols implemented in every major operating system.

1.1 System Structures

FIG. 1 is a block diagram that illustrates an example cloud-based system 100, according to an embodiment. The system includes a network 110 of interconnected communication devices using wired or wireless single channel or multichannel connections 105. User devices such as laptop 131 and mobile device 132 are connected to the network using one or more wired or wireless single channel or multichannel connections 105. One or more server nodes 120, often at different locations, also using one or more connections 105, provide services for devices connected to the system 100, and store data in one or more special storage nodes 140, often at different locations, also using one or more connections 105. In addition, in some systems, one or more sensors 150 (such as digital cameras, telescopes, laser and radar detectors, medical imagers, patient vital signs monitors, etc.) respond to physical phenomena with signals that are converted to data transmitted over connections 105 to other devices in the system 100. In addition, in some systems, one or more actuators 160 (such as assembly line robots, 2D and 3D printers, lasers, radiation sources, etc.) produce physical phenomena in response to signals received as data transmitted over connections 105 from other devices in the system 100. Each of these components include one or more software modules that operate the device and communicate with other devices in the systems, as represented by the module 181 for the nodes in network 110, module 182 for server(s) 120, module 183 for user device computer 131 or mobile device 132, module 184 for storage node(s) 140, module 185 for sensor 150, and module 186 for actuator 160. The software modules 181, 182, 183, 184, 185 and 185 are collectively referenced herein as software modules 180.

According to the client-server model, a client process sends a message including a request to a server process, and the server process responds by providing a service. The server process may also return a message with a response to the client process. Often, but not always, the client process and server process execute on different computer devices, called hosts or nodes, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, but not limited to those reasons.

Figure 2A:
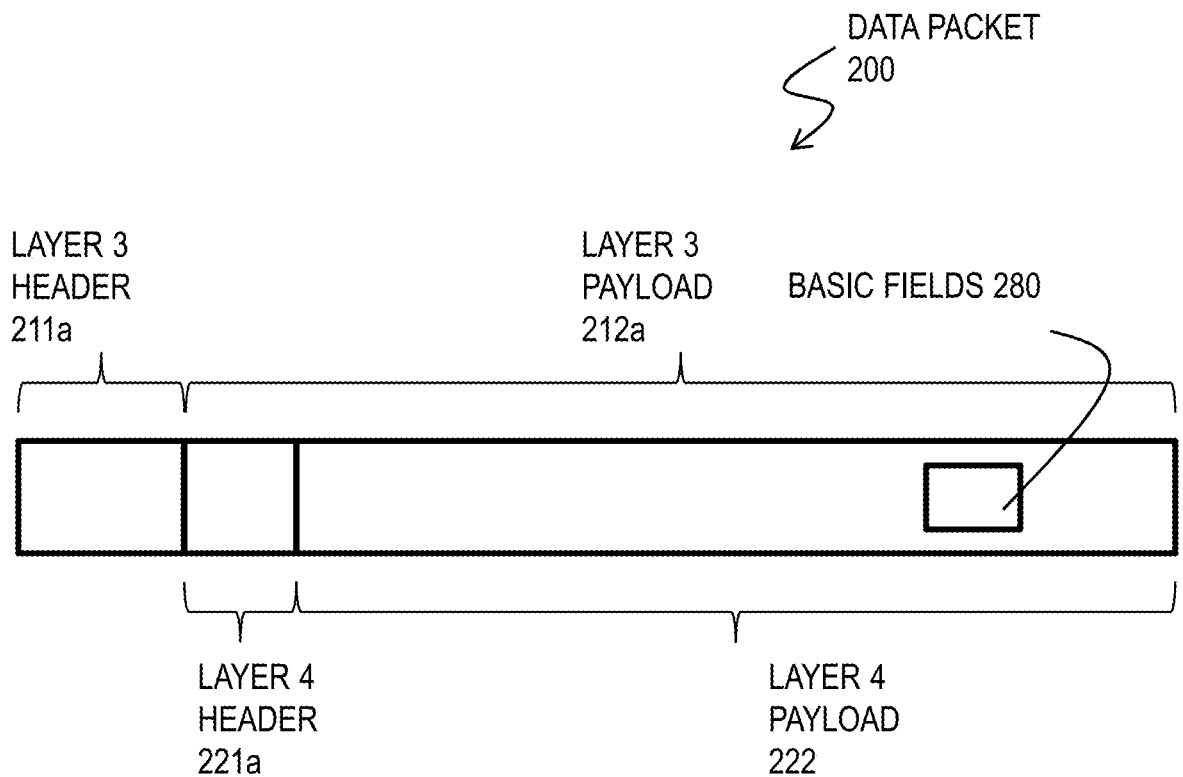
FIG. 2A and FIG. 2B are block diagrams that illustrate example packets, according to an embodiment.
Figure 2B:
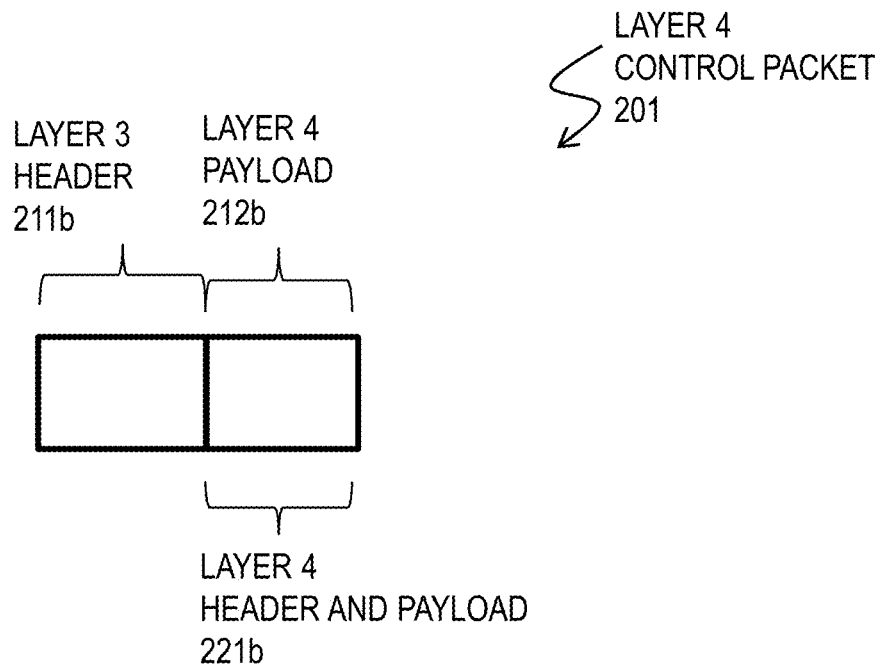

FIG. 2A and FIG. 2B are block diagrams that illustrate example packets with layer 3 and layer 4 headers, according to an embodiment. FIG. 2A illustrates an example data packet 200 with data provided for a Layer 4 or higher layer protocol, including various transport protocols. Such data packets 200 include headers 211*a* made up of a series of bits that indicate values for various Layer 1 and Layer 2 and Layer 3 fields, and a Layer 3 payload 212*a*. The Layer 3 payload 212a includes a Layer 4 header 221a that is made up of a series of bits that indicate values for various Layer 4 fields (such packet series number), and a Layer 4 payload 222. The Layer 4 payload 222 includes a series of bits that indicate values for the various fields of the header and payload of the higher layer protocols encapsulated by the Layer 3 protocol. No further protocol needs to be illustrated to describe the various embodiments. In various embodiments, the Layer 4 payload includes a plurality of basic fields 280. In many embodiments, the Layer 4 protocol is the UDP protocol, which is simpler and faster than the TCP protocol. The data packets can be layer 4 (UDP/TCP as example) or layer 5 (HTTP for example) and all basic fields would be in the payload. For example, in layer 4 embodiments, the system would use the destination and port to indicate the patient condition system traffic. In layer 5 embodiments, the system could be the URL in the case of a RESTful interface.

FIG. 2B illustrates an example control plane packet 201 for the Layer 4 protocol. As for the data packet 200, the control plane packet 201 includes a Layer 3 header 211b and a Layer 4 header and payload 221b.

Figure 3A:
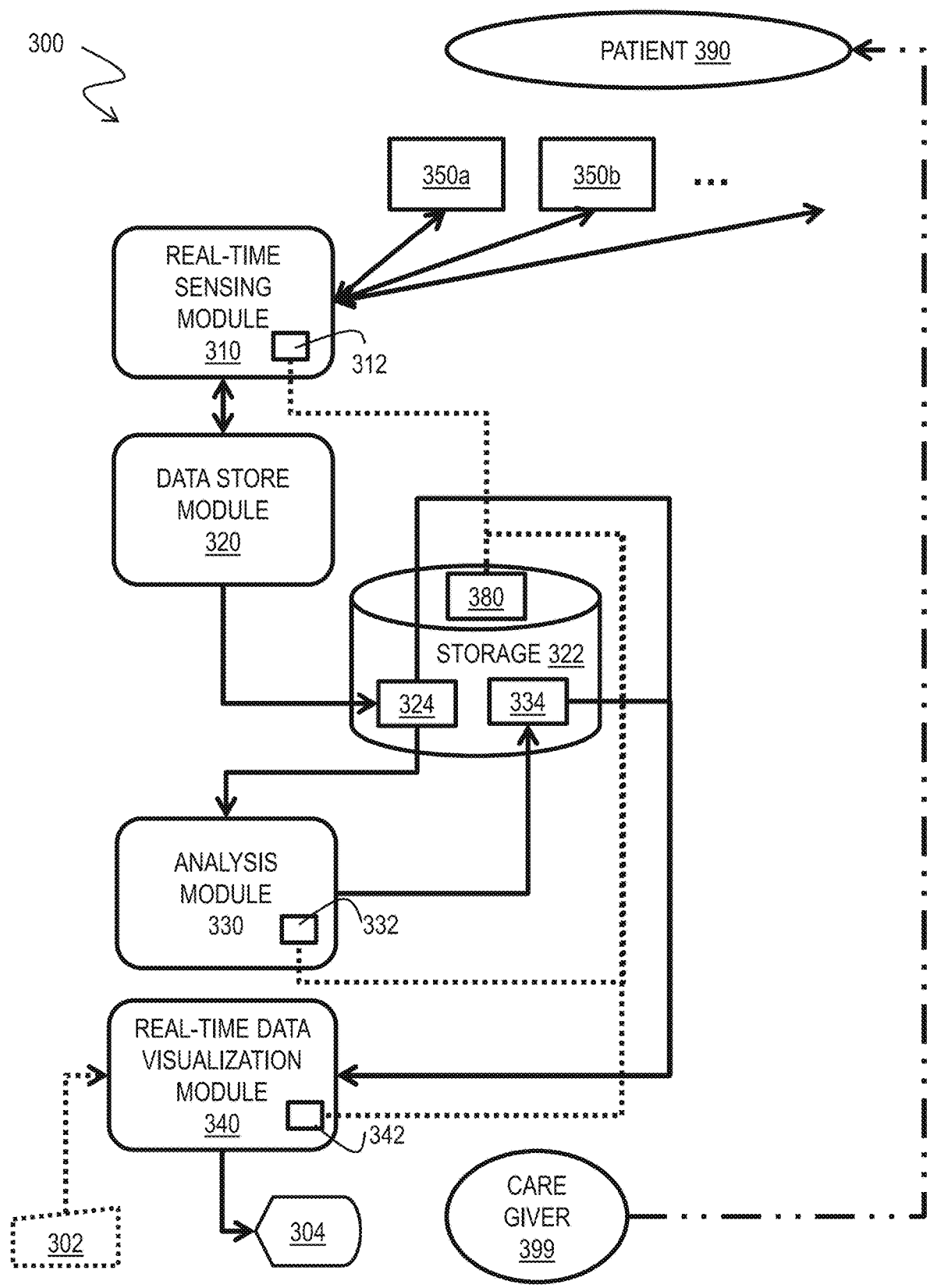
FIG. 3A is a block diagram that illustrates modules and data structures of a patient condition system, according to an embodiment.

FIG. 3A is a block diagram that illustrates modules and data structures of a patient condition system 300, according to an embodiment. Although a patient 390 and caregiver 399 are depicted, neither is part of system 300. The system 300 includes one or more patient sensors, such as depicted sensors 350a, 350b, among other indicated by ellipses, collectively referenced hereinafter as sensors 350. These sensors 350 are deployed in the vicinity of patient 390 and are each configured to measure at least one condition of the patient 390. For example, in various embodiments, sensors 350 are configured to make measurements for one or more of pressure point monitoring, blood flow monitoring, blood pressure monitoring, temperature monitoring, oxygen level monitoring, heart-rate monitoring, electrocardiogram (EKG) monitoring, skin integrity monitoring, biomarker monitoring, Inertial Measurement Unit (IMU) monitoring, and ultrasonic monitoring as well as visual monitoring using cameras, collectively called patient condition monitoring.

The system 300 includes real-time sensing module 310, data store module 320, data analysis module 330, real-time visualization module 340 and storage device 322, distributed over one or more hosts, such as end nodes 120, 131, 132, 140 or 150 or network intermediate nodes 110. As used herein, the term real-time means short in terms of human perception or changes in patient condition, such as within two hours of a sensor measurement for pressure injuries, or, in various other embodiments, within 10 minutes or less, or 5 minutes or less, or 2 minutes or less, or 1 minute or less, or 30 seconds or less, or 10 seconds or less, or 2 seconds or less, or 1 second or less of the sensor measurement.

The real-time sensing module 310 is a combination of software and hardware that is configured to interact with sensors 350 in the native interface of each sensor to cause the sensor to take samples and report same. The real-time sensing module 310 stores the reported samples in a local buffer. Thus, sensing module 310 is configured to receive, from a sensor, samples that indicate measurements by the sensor of a condition of a patient and storing data indicating values for the samples in a local buffer. In some embodiments the connection between a sensor 350 and module 310 is over a network so that the sensing module 310 need not be in the physical vicinity of the patient 390 or sensor 350.

The real-time sense module 310 is also configured to translate generic sensor commands into the native interactions understood by each sensor 350. Generic sensor commands include one or more of start, stop, operate in a particular range, operate at a particular sampling rate, and test maximum sampling rate (the latter also called maximum sensing throughput, herein). Such commands may be generated internally by module 310, or may be made in response to command packets received form another module of the system 300, as explained in further detail below.

In some embodiments, the real-time sensing module 310 also includes a data structure 312, such as a memory bank, that holds data that indicates, for each sensor, the sensor type, the native interactions for sensors of that type, an unique identifier for the particular sensor, and a unique identifier for the particular patient whose condition is being monitored by the particular senor. In some embodiments, the maximum sensing throughput is also stored in data structure 312. In some embodiments, some or all of the data in data structure 312 is shared with, or obtained from, a data structure 380 on a shared storage 322 on one or more hosts in a local or distributed database, using any data sharing protocol available.

The real-time sensing module 310 is also configured to respond to requests for sensor data by sending samples from the local buffer in sample packets that include within the Layer 4 payload a plurality of basic fields 280 used by module 310 for sending data indicating sample type, patient identifier, device identifier, timestamp, and sample value, as described in more detail below. If the sample packet travels outside a trusted network, then, in some embodiments, the data in one or more basic fields is encrypted. For example, at least the data in the sample value field is encrypted.

The real-time sensing module 310 is configured to report samples for the sensors 350 in response to a request packet, e.g., from a data store module 320. The sensing module 310 is a server process to sensor devices 350, which in this case would be the clients. The sensing module 310 is a client to the data store module 320. Thus, the sensing module 310 can act both as a client and a server depending on the application. In some embodiments, the sensing module 310 receives a sampling factor that indicates a fraction of the maximum sampling rate, wherein the fraction has a numerator of 1 and a denominator that is an integer, called a down sampling integer d. In some embodiments, the sampling factor is the integer d. In some embodiments, the sampling factor is indicated in the data structure 380 to which the sensing module 310 has access. Based on the sampling factor, the real-time sensing module 310 sends sample packets with every dth sample from the local buffer 312. In some embodiments, the data store module 320 indicates successful receipt of the sample packets; and, in response, the real-time sensing module 310 clears the buffer 312 of the samples bounded in time by the successfully sent samples. In some embodiments, a sensor 350 will send data at a sensor specific data rate and the real-time sensing module 310 is configured to capture all of the data sent.

Thus, the information about the native interaction with sensors 350 is limited to sensing module 310. The rest of the system 300 (including data store module 320, data analysis module 330, real-time visualization module, and data structures 324 and 334) is insulated from any direct interactions with the sensors 350.

The data store module 320 is configured to accept full or down-sampled samples from the real-time sensing module 310, and to store those samples in sample data structure 324 on shared data storage 322. Any data storage 322 may be used, including one or more local data storage devices, and one or more remote data storage hosts each with one or more storage devices, in any format such as flat files or hierarchical databases or relational databases or self-referential databases. Thus, the data store module 320 (also called a storage module, herein) is configured to receive from the sensing module 310 a sample data packet comprising basic fields holding data indicating sample type, patient identifier, device identifier, timestamp, and sample value, and to store into a sample data structure 324 the basic fields holding the data from the sample data packet.

To provide an end-to-end real-time visualization of patient condition, it is advantageous to synchronize the rates of the various stages (sensing, storage, analysis and visualization) to produce the most useful information at visualization. An update period is the time from sensing to visualization and is advantageously within the real-time criterion. In some embodiments, the throughput at each stage is adjusted to achieve advantageous system throughput by giving most of a shared processor power (e.g., central processing units or time or some combination) to the slowest stage in order visualize at least one metric within an update period. The relative rates of the various stages is determined at one or more times during configuration of the system, e.g., once per setup, or once per day. This might involve determining the maximum throughput at each stage. For example, if storage and visualization are orders of magnitude faster than sensing and analysis, and. if data sampling is four times faster than determining a metric during analysis, but two samplings are needed per metric, then only 50% of the samples are needed, which is achieved by down sampling using a down sampling integer of d=2. Thus, in some embodiments, maximum throughput of each stage is determined and used with the update period to determine a percentage of the maximum rate to use at each stage. In some embodiments, the system is configured to capture all data. To meet a given throughput requirement in such embodiments, the system configuration is changed dynamically by scaling or adding resources. For the sensing module 310, this could be by adding additional hardware or, if the sensing module 310 is located on a cloud-based system, additional resources can be created and provisioned. In various embodiments, the maximum or percentage throughput, or both, for each stage is stored in data structure 380 and shared with one or more modules 310, 320, 330, 340, as requested.

Thus, in some embodiments, the data store module 320 includes retrieving system data from data structure 380 that indicates a real-time update period, and a sensor rate indicating a rate of producing, from a sensor, samples that indicate measurements of a condition of a patient. In some embodiments, the data store module 320 computes the sampling factor. In some embodiments, the sampling factor is predetermined and stored in the system data structure 380. In such embodiments, the data store module includes retrieving a sampling factor that indicates what fraction of the samples from each sensor 350 to store for patient monitoring.

The analysis module 330 is configured to determine metrics that indicate patient disposition for a particular disorder, such as predisposition or risk of heart attack, or stroke or shock or bed sores, based on one or more samples in the sample data structure 324. Any known analysis may be used. For example, data analytics tools such as Hadoop, Spark, Kafka, Nifi, Docker, and several others known to a person of ordinary skill, are used in various embodiments, alone or in some combination. Information, such as computer instructions, on how to convert samples to metrics, e.g., to derive metrics from samples for a particular suite of sensors 350 and a particular patient disorder, is stored in one or more analysis data structures 332. In some embodiments, some or all of the data in data structure 332 is shared with, or obtained from, a data structure 380 on a shared storage 322 on one or more hosts in a local or distributed database, using any data sharing protocol available.

The analysis module 330 retrieves from a sample data structure 324 basic fields holding data indicating sample type, patient identifier, device identifier, timestamp, and sample value, then determines a metric based on the sample value, and then stores into a metric data structure 334 metric fields holding data indicating metric type, patient identifier, device identifier, timestamp, and metric value. Like the sample data structure 324, the metric data structure 334 is stored on shared data storage 322. Any data storage 322 may be used, including one or more local data storage devices, and one or more remote data storage hosts each with one or more storage devices, in any format such as flat files or hierarchical databases or relational databases or self-referential databases. Thus, the analysis module 330 is configured to determine a metric based on the sample value, and to store into a metric data structure metric fields holding data indicating metric type, patient identifier, device identifier, timestamp, and metric value.

In some embodiments, the analysis module 330 includes retrieving system data that indicates a real-time update period, and an analysis rate indicating a rate of deriving a metric from samples that indicate measurements from a sensor of a condition of a patient.

The real-time visualization module 340 is configured to present, on a display device, such as display 814 depicted in FIG. 8 or display 1007 depicted in FIG. 10, described below, visible to a care giver 399, one or more samples or metrics that indicate patient disposition for a particular disorder. Any known visualizations may be used; but, time series showing trends in one or more samples or metrics are advantageous. In some embodiments, specialized visualization is advantageous. For example, to visualize a graph one could use Visualize-Graph, and to visualize a heat map one could use Visualize-Heat-Map. The real-time data visualization module 340 takes in a list of-samples or metrics and visualizes these in some way. Information on how to present samples or metrics, such as computer instructions, is stored in one or more visualization data structures 342. In some embodiments, some or all of the data in data structure 342 is shared with, or obtained from, a data structure 380 on a shared storage 322 on one or more hosts in a local or distributed database, using any data sharing protocol available.

The real-time data visualization module 340 retrieves from the metric data structure 334 metric fields holding data indicating metric type, patient identifier, device identifier, timestamp, and metric value. In some embodiments, the visualization module 340 retrieves from the sample data structure 324 basic fields holding data indicating sample type, patient identifier, device identifier, timestamp, and sample value. The visualization module uses the information in data structure 342 to generate a visualization, such as a time series plot, and presents that on a display device 304 either on a local node or on some remote node in the network. In some embodiments, the visualization is automatic, without human intervention. In some embodiments, user input from care giver 399 is received on some local or remote input device 302, such as input device 812 or pointing device 816 depicted in FIG. 8 or microphone 1011 or keyboard 1047 or lens 1063 depicted in FIG. 10, and used to choose or modify the visualization, e.g., to zoom or scroll or select one of multiple possible visualization of metrics or samples. Thus, the visualization module 340 is configured to present the sample or the metric on a display device configured to be viewed by a care giver for the patient. In response, the care giver provides care, such as intervention or treatment or therapy or rest, to the patient in response to the presentation made on display 304.

In some embodiments, the visualization module 340 includes retrieving system data that indicates a real-time update period, and a visualization rate indicating a rate of presenting, to a care giver of a patient, a sample that indicates a measurement from a sensor of a condition of the patient or a metric derived from the sample or some combination. The visualization rate is at least one new metric value or sample value per update period.

Figure 3B:
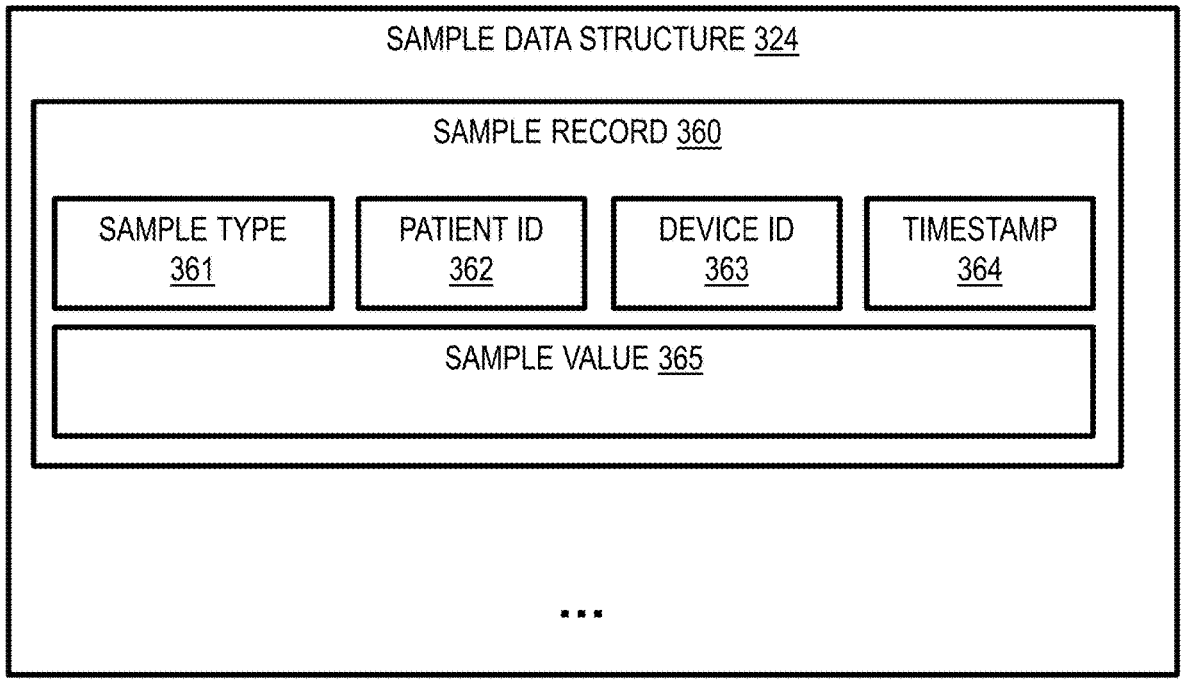
FIG. 3B through FIG. 3E are block diagrams that illustrate fields of data structures or communications packets of the system, according to an embodiment.

Although processes, equipment, and data structures are depicted in the attached drawings as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts FIG. 3B through FIG. 3E are block diagrams that illustrate fields of data structures or communications packets of the system, according to an embodiment. FIG. 3B depicts an example of a sample data structure 324. Each sample data structure includes one or more sample records, including sample record 360 among other indicated by ellipsis. Each sample record includes a sample type field 361, a patient identifier (ID) field 362, a device identifier (ID) field 363, a timestamp field 364 and a sample value field 365

The sample type field holds data that indicates a sample type, e.g., a six channel electrocardiogram (EKG) type sample. The patient ID field 362 holds data that uniquely indicates a particular patient under care of one or more care givers at a clinic or other facility. To protect privacy in some embodiments, patient ID is associated with the particulars of a patient in a confidential or encrypted data record or file. The device ID field 363 holds data that indicates a particular sensor that provides the sample type, e.g., a particular EKG device, such as a model and serial number or a media access control (MAC) address or some combination. The timestamp field 364 holds data that indicates a date and time that a sample was taken by the device indicated in the device ID field 363. The time resolution is suitable for the application, e.g., having a resolution that is a small fraction of the update period or real-time criterion, such as one tenth or one hundredth or one thousandth of the update period. The sample value field 365 holds data that indicates one or more values output by the sensor indicated in device field 363 when measuring the condition of the patient identified in patient ID field 362 associated with time indicated in the timestamp field 364. The number of values can be construed as a number of vectors each with a same or different number of elements. For example, the sample value field holds a vector of several one hundred millisecond electric field measurements for each of six electrodes of the EKG device indicated in device ID field 363 starting (or ending or centered) at a time given by timestamp 364 while attached to the patient indicated in the patient ID field 362. The number of vectors and the number of elements in each vector are associated in a data structure, such as in data structure 380, with the sample type indicated in sample type field 361. In some embodiments, the sample value field 365 is single valued, equivalent to a single vector with a single element.

In various embodiments, the same fields are send in basic fields 280 of one or more data packets 200. In some embodiments one or more fields of record 360 or data packet 200 hold encrypted data, so that patient data is securely stored or transmitted or both.

Figure 3C:
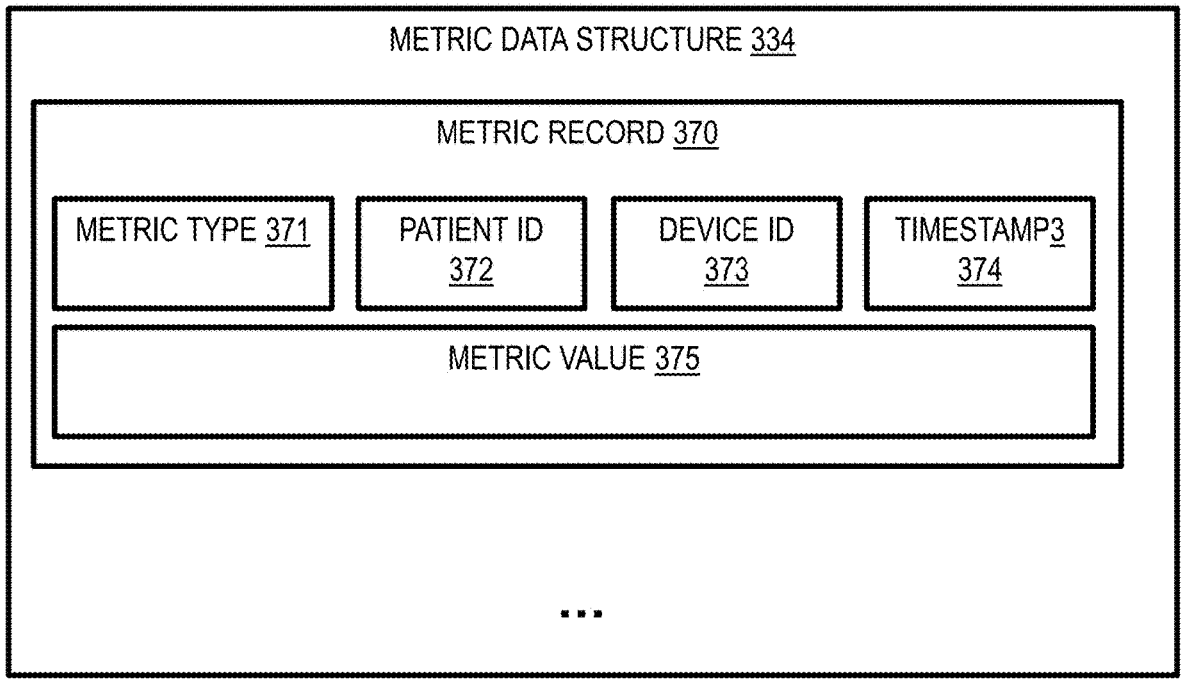

FIG. 3C depicts an example of a metric data structure 334. Each metric data structure 334 includes one or more metric records, including metric record 370 among other indicated by ellipsis. Each metric record includes a metric type field 371, a patient identifier (ID) field 372, a device identifier (ID) field 373, a timestamp field 374 and a metric value field 375.

The metric type field holds data that indicates a metric derived from the sample type, e.g., a ventricular tachycardia (VT) event derived from six channel electrocardiogram (EKG) sample. The patient ID field 372 holds data that uniquely indicates a particular patient under care of one or more care givers at a clinic or other facility. The device ID field 373 holds data that indicates a particular sensor that provides the samples for the metric type, e.g., a particular EKG device given by a model and serial number or MAC address or some combination. The timestamp field 374 holds data that indicates a date and time that a sample was taken by the device indicated in the device ID field 373 and used to derive the metric value. The time resolution is suitable for the application, e.g., having a resolution that is a small fraction of the update period or real-time criterion, such as one tenth or one hundredth or one thousandth of the update period. The metric value field 375 holds data that indicates one or more values output by the analysis module 330 based on samples from the sensor indicated in device field 373 when measuring the condition of the patient identified in patient ID field 372 associated with time indicated in the timestamp field 374. The number of values can be construed as a number of vectors each with a same or different number of elements. The number of vectors and the number of elements in each vector are associated in a data structure, such as in data structure 380, with the metric type indicated in metric type field 371. In some embodiments, the sample value field 375 is single valued, equivalent to a single vector with a single element. For example, the metric value field holds single value indicating a number of VT events in the previous ten seconds derived from 100 vectors of hundred millisecond electric field measurements for each of six electrodes of the EKG device indicated in device ID field 373 starting (or ending or centered) at a time given by timestamp 374 while attached to the patient indicated in the patient ID field 372.

In various embodiments the same fields are sent in as basic fields 280 in one or more data packets 200. In some embodiments one or more fields of record 370 or data packet 200 hold encrypted data, so that patient data is securely stored or transmitted or both.

Figure 3D:
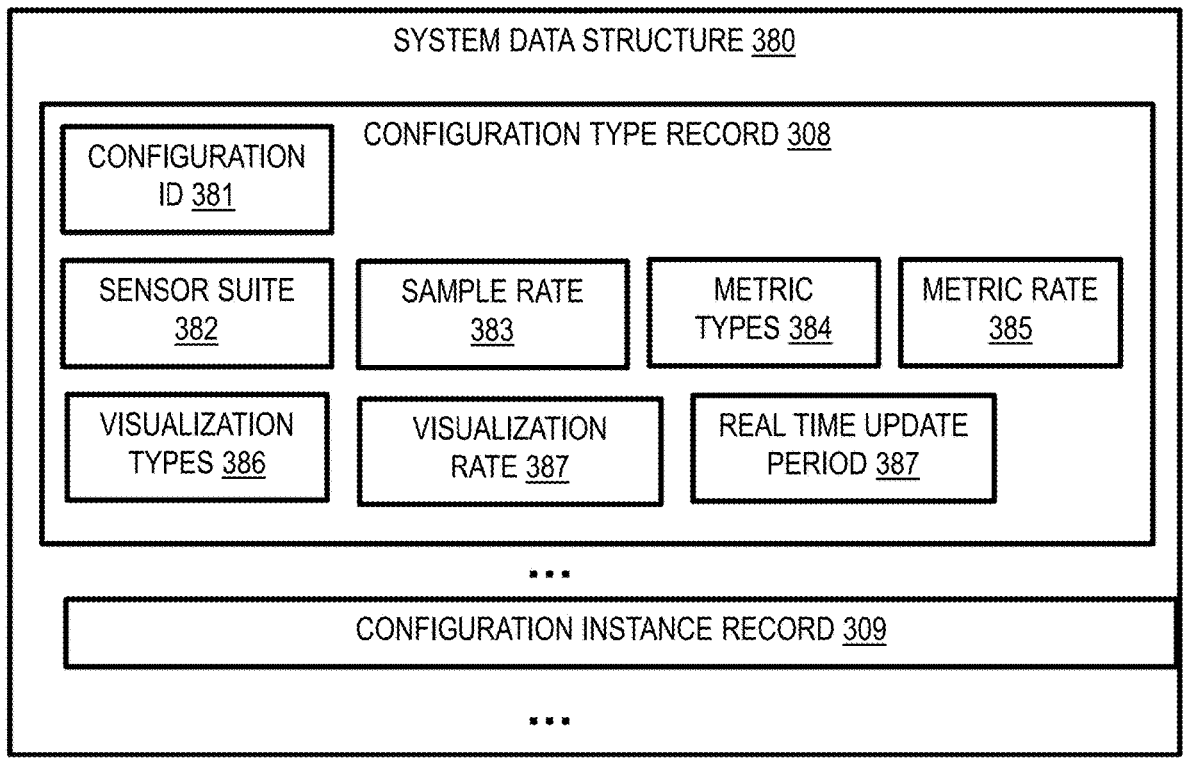

FIG. 3D depicts an example of a system data structure 380 used to configure a system for a particular configuration of sensors and analyses and visualization to monitor a particular disorder in one or more patients in a clinic or other facility. The system data structure 380 includes one or more configuration type records, such as configuration type record 308 among others indicated by ellipsis. Each configuration record 308 includes a configuration identifier (ID) field 381, a sensor suite field 382, a sample rate field 383, a metric types field 384, a metric rate field 385, a visualization types field 386, a visualization rate field 387 and a real-time update period field 387. In other embodiments other information is stored, such as where each component is being run, e.g. local, cloud, or private server, and the type of storage. In some embodiments, instead of isolating all this information as separate fields in a data structure, all this information is stored as computer instructions tailored for a particular disorder and sensor suit. In various embodiments, throughput of the configuration is checked to demonstrate that the given configuration can meet any required throughput using the system's profiling feature The configuration ID field holds data that indicates a unique configuration type, which is associated in record 308 with a collection of sensor types, analyses, and visualizations that may be applied to different patients at different times for monitoring the same disorder type, such as risk of heart attacks or risk of pressure injuries. The sensor suite field 382 holds data that indicates one or more senor types for the configuration type of the current record 308. Sample rate field 383 holds data that indicates the sampling rate to use for each sensor type. In some embodiments, the sample rate field 383 includes information about both the maximum sampling rate of each of the one or more sensor types, and the sampling fraction for each of the one or more sensor types for use in real-time monitoring.

The metric types field 384 holds data that indicates one or more metrics to compute for the configuration type of the current record 308. Any data that indicates the metric computation can be used, such as data indicating metric computation processor instructions, or a reference to a routine used for determining the metric. Metric rate field 385 holds data that indicates the number of metrics to compute per second for each metric type. In some embodiments, the metric rate field 385 includes information about both the maximum metric computation rate for each of the one or more metric types, and a reduced rate for each of the one or more metric types for use in real-time monitoring. Metric rate includes the times to retrieve the samples from storage 322, to make the computations, and to store the resulting metric in storage 322 or the total of these times or some combination.

The visualization types field 386 holds data that indicates one or more visualizations to present for the configuration type of the current record 308 based on zero or one or more metrics and zero or more samples. Any data that indicates the visualization can be used, such as data indicating visualization processor instructions, or a reference to a routine used for visualizing the metric or sample or both. Visualization rate field 387 holds data that indicates the number of visualizations to present per second for each visualization type. In some embodiments, the visualization rate field 387 includes information about both the maximum rate for presenting each of the one or more visualization types, and a similar or reduced rate for each of the one or more visualization types for use in real-time monitoring. Visualization rate includes the times to retrieve the metrics or samples or both from storage 322, and to present the result on display device, or the sum of these times or some combination.

The real-time update period field 386 holds data that indicates how often the visualization is to be updated. The update period indicated in this field puts a limit on how many samples can be stored and processed through visualization as described elsewhere in this specification.

In some embodiments, the system data structure 380 includes one or more configuration instance records, such as configuration instance record 309 among others indicated by ellipsis. In these embodiments, the configuration instance record indicates an instance of a configuration type, such as a heart attack monitoring type, for a particular patient using particular sensors. Such records have similar fields as configuration type record 308 but would hold data indicating the actual devices being used. For example: a configuration ID field 381 holds data indicating an unique instance identifier (ID); a sensor suite field 382 holds data indicating the device IDs of the actual sensor used in the instance; the sample rate field 383 holds data indicating the actual maximum throughput for this instance and the actual sampling factor computed for this instance; the metric rate field 385 holds data indicating the actual maximum metric throughput for this instance and the actual real-time rate computed for this instance; and, the visualization rate field 385 holds data indicating the actual maximum visualization throughput for this instance and the actual real-time rate computed for this instance. In addition, a patient ID field is included that indicates the patient ID of the actual patient being monitored by this instance.

In various embodiments device data structure 312 includes one or more fields from the system data structure 380.

Figure 3E:
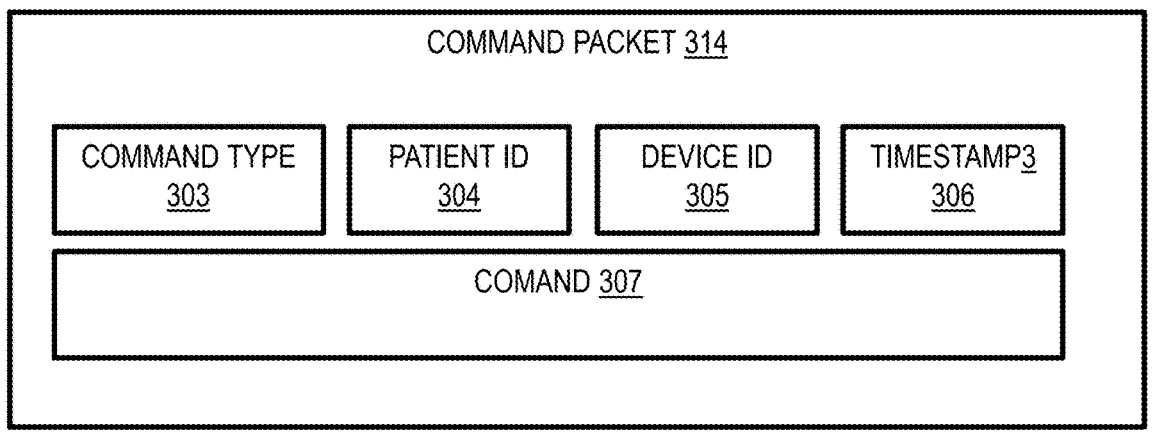

FIG. 3E depicts an example of a command data packet 314. Each command data packet 314 includes a command type field 303, a patient identifier (ID) field 304, a device identifier (ID) field 305, a timestamp field 306, and a command field 375. These fields are sent in basicfields 280 of a data packet 200 or in a control packet 201, e.g., to deliver rate change commands to the sensing module 310 from other modules, such as the data store module 320.

The command type field 303 holds data that indicates a particular type of command, e.g., an interface parameter, for a particular device type. For example, a command to power a recording of a channel of six channel electrocardiogram (EKG) or a command to change the measurement range of a temperature or pressure sensor, or a command to change the sampling rate of the device. The patient ID field 372 holds data that uniquely indicates a particular patient under care of one or more care givers at a clinic or other facility. The device ID field 373 holds data that indicates a particular sensor that provides the samples, e.g., a particular EKG device. The timestamp field 374 holds data that indicates a date and time that the command is issued. The command field 375 holds data that indicates one or more values for the particular command type, such as on (start) or off (stop) for a power command; a range for a operation range command, e.g., 5 to 10 pounds per inch for a pressure sensor; and a sampling rate for sensor, such as 10 hertz or 1000 hertz.

Although fields, records and data structures are depicted in the FIG. 3B through FIG. 3E as integral blocks in a particular arrangement for purposes of illustration, in other embodiments one or more fields, records or data structures, or portions thereof, are arranged in a different manner or order, or are omitted, or one or more different fields or records or data structures are included.

1.2 System Methods

Figure 4:
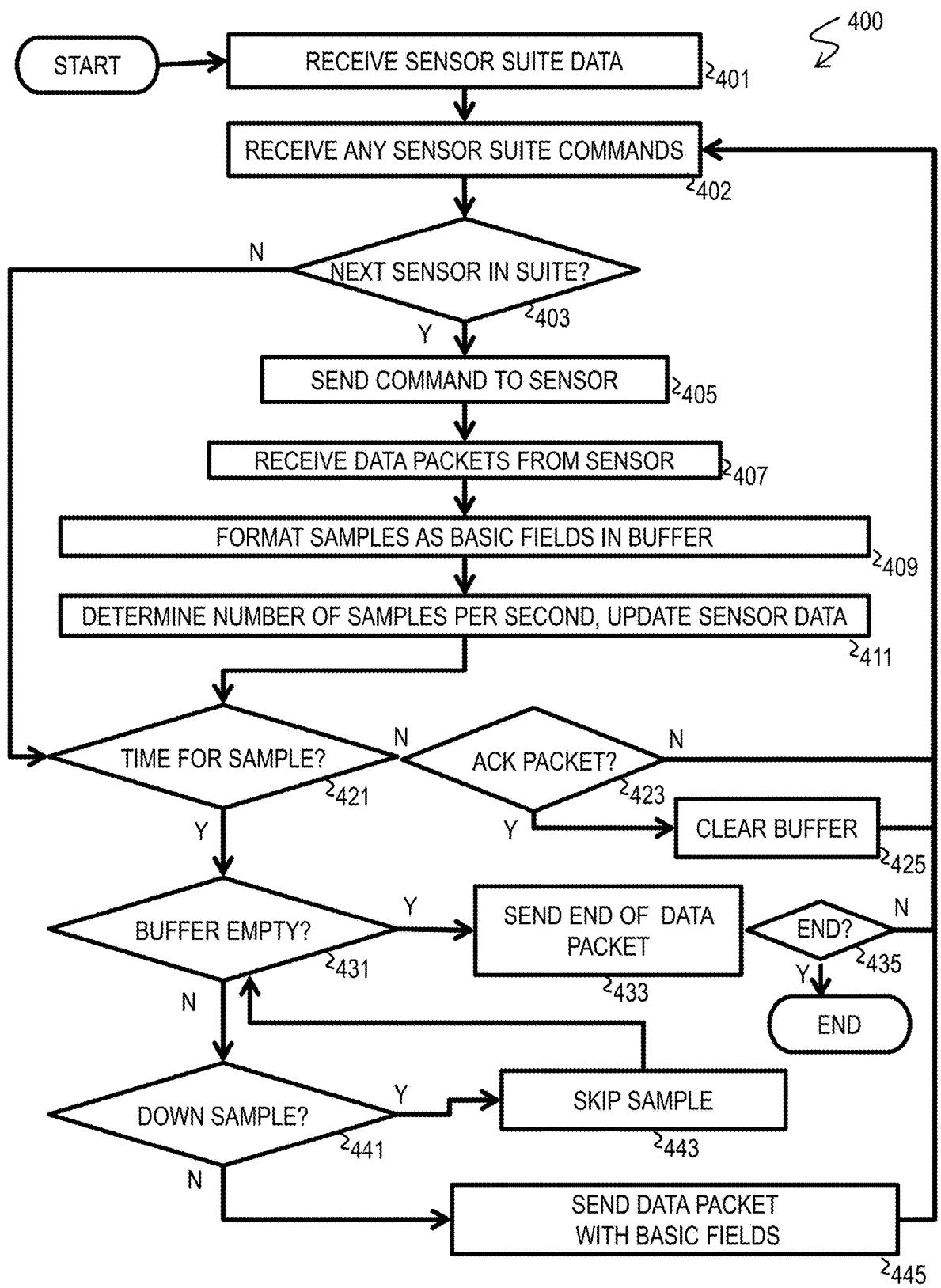
FIG. 4 is a flow chart that illustrates a method for a sensing module of a MAP system, according to an embodiment.

FIG. 4 is a flow chart that illustrates a method 400 for a sensing module 310 of a patient condition system, according to an embodiment. Although steps are depicted in FIG. 4, and in subsequent flowcharts FIG. 5 through FIG. 7, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401 sensor suite data is received, either unsolicited or in response to a retrieval from or query to a local or remote database, such as from data structure 312 or system data structure 380, or some combination. The sensor suite data indicates the device IDs, types of sensors, and patient ID for the sensing part of the system 300. This information is available for example in configuration type record 308 and configuration instance record 309, described above. Also included is information about the native interactions with the sensors 350, including translations from the commands in a command packet 314 into the native interaction with each of the sensors 350.

In step 402, a command data packet is received with basic fields 280 that hold data that indicates a command to issue to one or more sensors 350. For example, one or more command data packets are received with basic fields 280 that hold data that indicates to start all six channels of an EKG and sample at a fastest rate.

In step 403, it is determined if there is another sensor in the suite to obtain data from. If not, control passes to step 421 and beyond to process any requests for samples from data store module 320, as described in more detail below. If so, control passes to step 405 for the next sensor in the suite of sensors. In step 405, any commands for the particular sensor received since the last interaction with the sensor are issued to the sensor. For example, the sensor is commanded to start six channels of EKG sensing. If a sensor has been started and not stopped, the sensor continues to generate sensed measurements of the patient condition in a native data stream.

In step 407, the data is received at sensing module 310 from the sensor in a native stream, e.g., of one or more data packets. In various embodiments, sensing module 310 is sensing UDP packets or Bluetooth packets or some combination. In step 409, the native samples are reformatted into corresponding basic fields, and stored in a local buffer. In step 411 the number of samples successfully stored per second is determined; and, if greater than a current actual maximum throughput in sample rate field 383 of the current instance record 309, is used to update that field. This step 411, in response to a command to sample at the fastest rate, stores the actual maximum throughput of the sensor in the field 383 of the current configuration instance record 309.

In step 421, it is determined if it is time to send samples. If not, control passes to step 423.

In step 423, it is determined whether an acknowledgement packet is received that indicates the last sample data packet received successfully by the data store module 320. Such an acknowledgement packet is a data packet 200 or data control packet 201, with basic fields 280 holding data that indicates a sample type and a patient ID and device ID and a timestamp. In some embodiments, no other basic fields in the packet indicates the packet is an acknowledgement for all the samples through the time stamp. In some embodiments, a different basic field, called a packet type field (not shown), holds data that indicates the packet includes an acknowledgement. If an acknowledgement packet is received, then in step 425 the local buffer for that sample type is cleared through that timestamp. In some embodiments, step 423 is omitted and the buffer is cleared after the sample data packet is sent.

If no such acknowledgement packet is received, or after clearing the buffer, control passes back to step 402 to see if any other sensor commands packets are received, and in any case, to determine the next sensor in the suite in step 403.

If it is determined, in step 421, that it is not time to send a sample packet, then control passes to step 431. In step 431 it is determined if the buffer for the sample is empty. If so, then in step 433 a packet is sent that indicates an end of data. In some embodiments, the end-of-data packet is a data packet 200 or control packet 201 that repeats the request basic fields but has no other basic fields. In some embodiments, the end-of-data packet is a data packet 200 or control packet 201 that repeats the request basic fields but has a null value in one or more other basic fields, such as device ID field 363 or timestamp field 364 or sample value field 365. Control then passes to step 435.

In step 435, it is determined whether end conditions are satisfied, e.g., one or more sensors are offline, or all sensors have been commanded off, or the patient is removed from the vicinity of the sensor or other end condition. If so, the process ends. Otherwise, control passes back to step 402 to see if any other sensor commands packets are received, and in any case, to determine the next sensor in the suite in step 403.

If it is determined, in step 431, that the buffer for the sample is not empty, then control passes to step 441. In step 441, it is determined whether the next sample in the local buffer is subject to down sample, i.e., is a sample that is not desired by the data store module 320. Any method may be used to determine this. For example, if the buffer sample is not a multiple of the sample integer d, then it is subject to down sample. In that case, control passes to step 443 to skip the sample; and, then control passes back to step 431 to determine whether the buffer is now empty. In various embodiments, the sample integer d is included in a field (not shown) in the request packet, or in a field (not shown) in the system data structure 380, or computed based on the real-time update period and the sample rate and the matric rate and the visualization rate from corresponding fields in system data structure 380, and stored locally.

If it is determined, in 441, that the next sample in the local buffer is not subject to down sample, then control passes to step 445. In step 445, the same is moved from the buffer to a sample data packet 200 in which the basic fields 280 send sample type field 361, patient ID field 362, device ID field 363, timestamp field 364 and sample value field 365. The sample data packet 200 is then send to the requesting data store module 320, e.g., in the payload of one or more UDP or TCP packets. Control then passes back to step 402 and following to receive any more commands and determine the next sensor in the suite.

Figure 5:
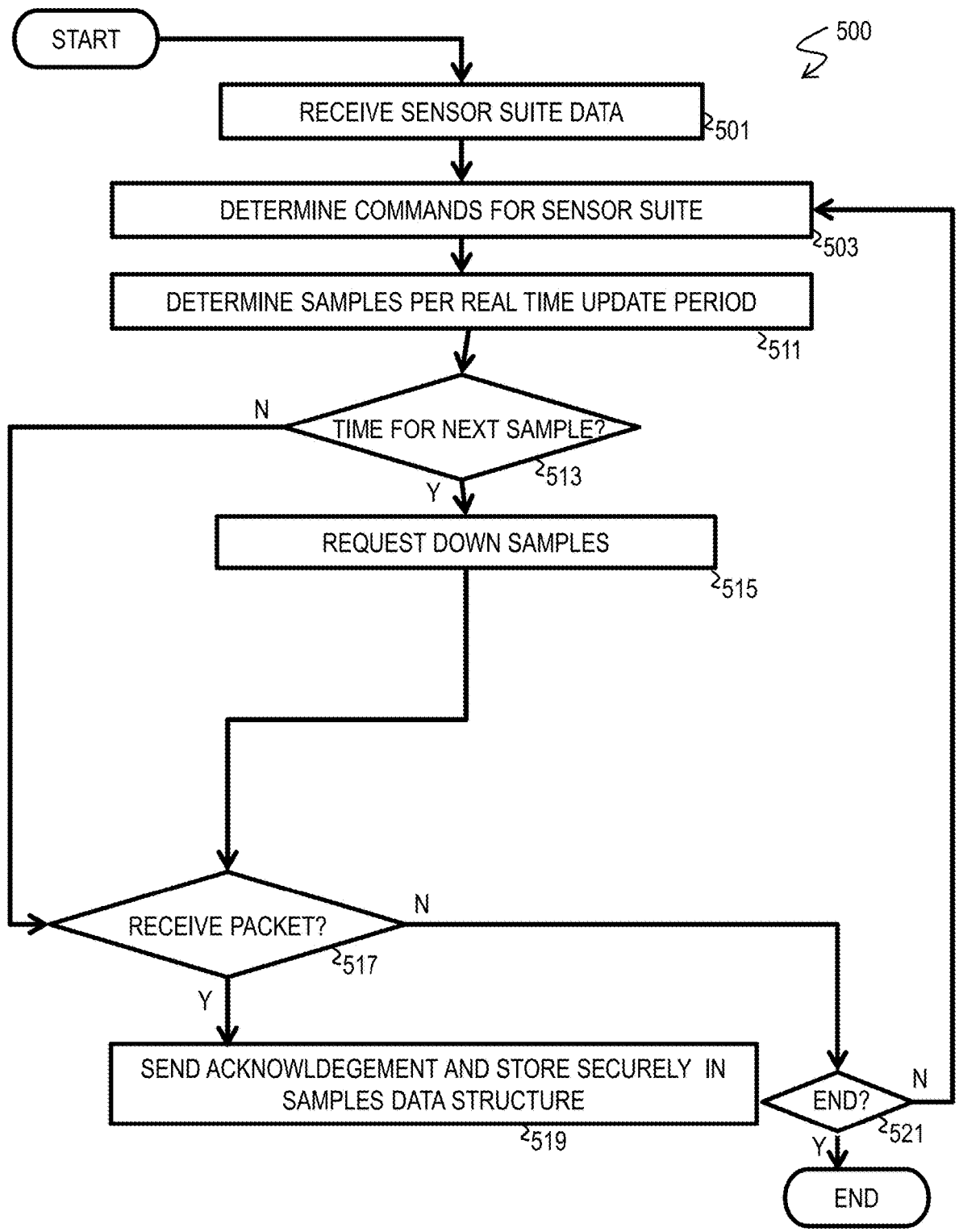
FIG. 5 is a flow chart that illustrates a method for a store module of a system, according to an embodiment.

FIG. 5 is a flow chart that illustrates a method for a store module 320 of a system, according to an embodiment. In step 501, sensor suite data is received, either unsolicited or in response to a retrieval from or query to a local or remote database, such as from data structure 312 or system data structure 380, or some combination. The sensor suite data indicates the device IDs, types of sensors, and patient ID for the sensing part of the system 300. This information is available for example in configuration type record 308 and configuration instance record 309, described above. Information about the native interactions with the sensors 350 is not needed because that information is confined to the sensing module 310; and, the data store module 310 is insulated from need for that information.

In step 503, the data store module 310 decides how to operate the sensor suite using generic commands, such as start/stop, set operating range, and set sampling rate. For example, at one pass through step 503 it is determined to operate the sensors at their maximum rates to determine the greatest throughput possible. At a later pass, the operational range and sampling rate are set advantageously for real-time throughput. If the sampling is already being done at the desired rate and range, no new command is issued in step 503.

In step 511, the number of samples is determined for use in the real-time update period. For example, when there is a single processor that shares time among all four modules 310, 320, 330, 340, then, based on the maximum sampling rates and the update period stored in fields 383, 385, 386 and 387, the update period is divided into portions for each module. If actual throughputs have not yet been measured, then the sensor type throughput in those fields are used. Those portions are inversely related to the maximum throughput for each module. The portion for sampling determines the sampling rate to use for that update period. If the sampling rate is an integer factor d less than the maximum sampling rate, then down sampling is used. If the sampling rate has already been determined, then step 511 is skipped or omitted.

In step 513, it is determined whether it is time for the next sample. If not, control passes to step 517, described below. If so, then in step 515 it is determined if the down sampling is to be changed. If so the down sampling is changed, e.g., by changing the value of a field in system data structure 380. In some embodiments, step 515 is omitted. Control then passes to step 517.

In step 517, it is determined whether a data packet including basic fields holding sample data fields is received. If not, control passes to step 521 to determine whether end conditions are satisfied. If so, the process ends. Otherwise, control passes back to step 503 and following, described above.

If it is determined in step 517 that a data packet with basic fields holding sample fields is received, control passes to step 519. In step 519, an acknowledgement packet is sent to the sensing module 310 in some embodiments that use acknowledgement packets. In addition, the samples received in the most recent data packet are stored securely in the samples data structure 324 on storage 322. In some embodiments, e.g., where the storage 322 is offsite, at least the data in the sample value field 365 is encrypted. Control then passes to step 521 to determine if end conditions are satisfied, as described above.

Figure 6:
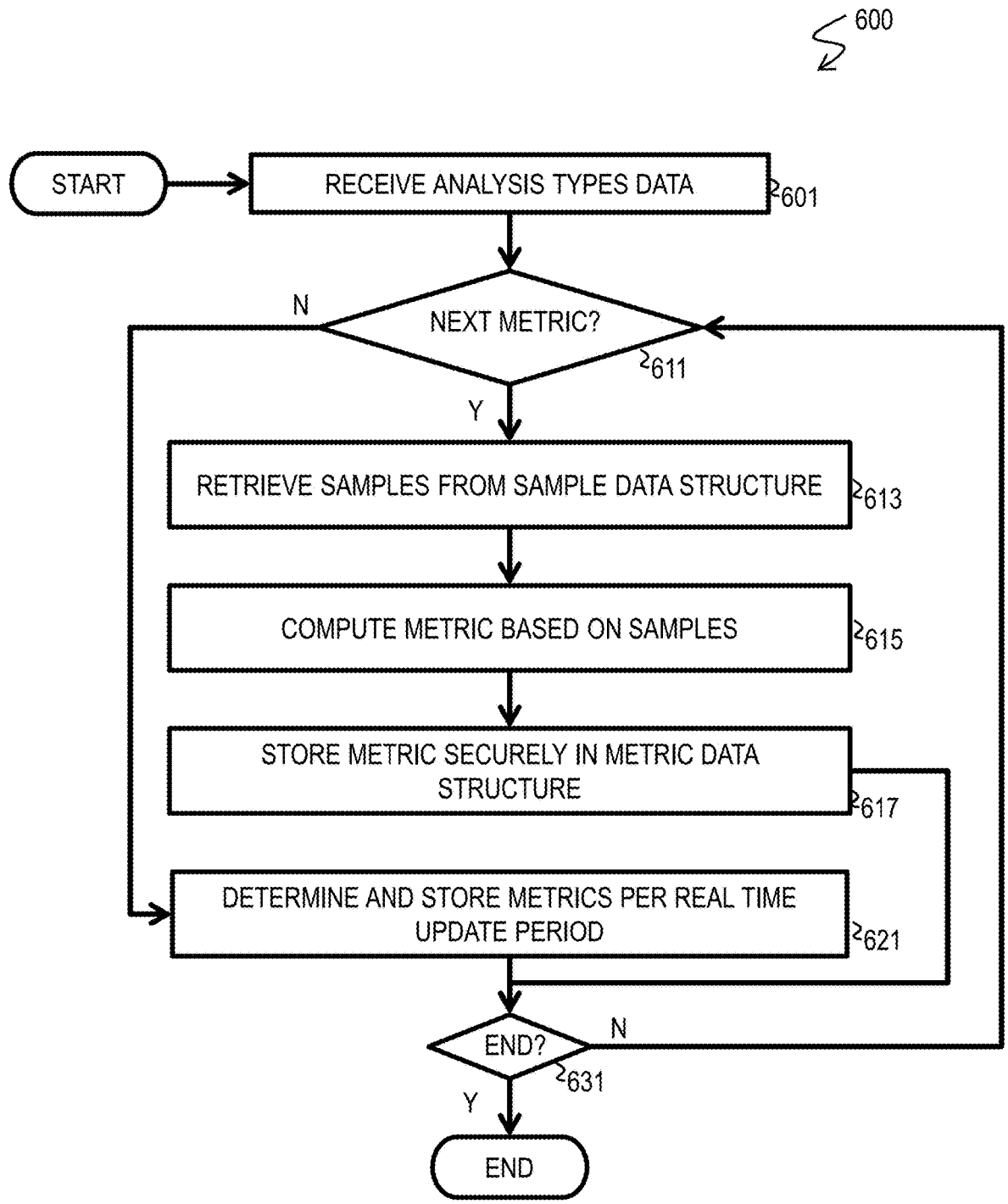
FIG. 6 is a flow chart that illustrates a method for an analysis module of a system, according to an embodiment.

FIG. 6 is a flow chart that illustrates a method 600 for an analysis module of a system, according to an embodiment. In step 601, analysis types data is received, either unsolicited or in response to a retrieval from or query to a local or remote database, such as from data structure 332 or system data structure 380, or some combination. The analysis types data indicates the metric types and the instructions to generate each metric type from the samples as well as the metric rate for a real-time update period. This information is available for example in field 384 of configuration type record 308, and in field 385 in configuration type record 308 or configuration instance record 309, described above. Information about the native interactions with the sensors 350 is not needed because that information is confined to the sensing module 310; and, the analysis module 330 is insulated from needing that information.

In step 611, it is determined whether it is time to compute the next metric. If not, or if the time to compute the next metric is not known, then control passes to step 621. In step 621, the number of metrics to be determined per real-time update period is determined. For example, this value is read from field 385 in a configuration type record 308 or configuration instance record 309. In some embodiments, under some conditions such as upon start up, the maximum throughput of the metric computation is determined, including the time to retrieve samples from sample data structure 324, the time to compute all metrics, and the time to store the metric value in metric data structure 334, and the actual metric maximum throughput is stored in field 385 of configuration instance record 309. Then the metric rate for the real-time update period is determined based on the relative rates of sampling, storing and visualization and the real-time update period and the number of processors available. The newly determined actual metric rate is then stored in field 385 of configuration instance record 309. Control then passes to step 631.

In step 631, it is determined whether end conditions are satisfied. If so, the process ends. Otherwise, control passes back to step 611 described above.

If it is determined in step 611 that it is time to compute the next metric, then control passes to step 613. In step 613, samples are retrieved from sample data structure 324 on storage 322. In step 615, the metric is determined based on the metric instructions and the samples. In step 617, the metric is stored securely in metric data structure 334 on storage 322, such as in fields 372 through field 375 in record 370. In some embodiments, e.g., where the storage 322 is offsite, at least the data in the metric value field 375 is encrypted. Control then passes to step 631 to determine if end conditions are satisfied, as described above.

Figure 7:
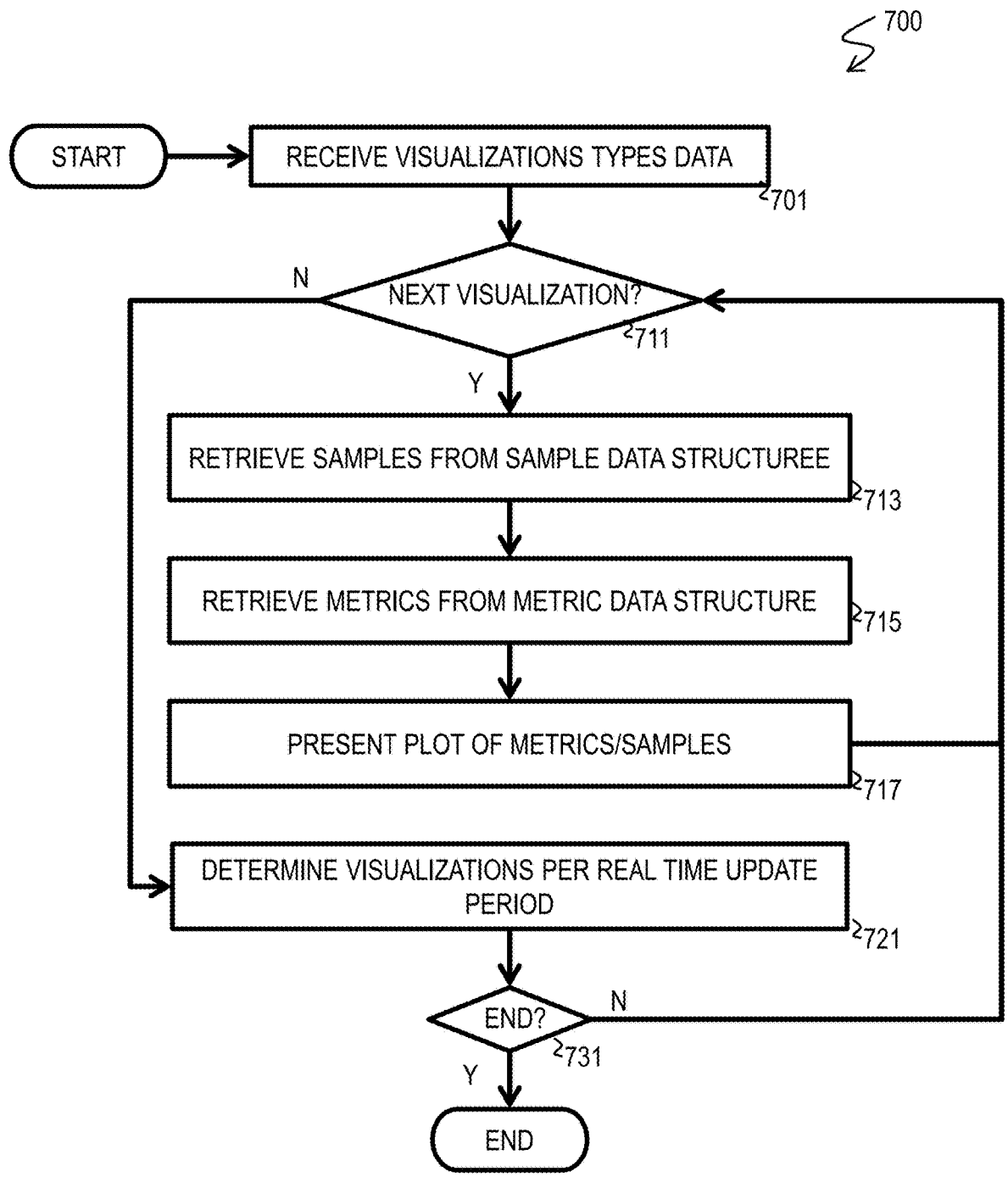
FIG. 7 is a flow chart that illustrates a method for a visualization module of a system, according to an embodiment.

FIG. 7 is a flow chart that illustrates a method 700 for a real-time data visualization module 340 of system 300, according to an embodiment. In step 701, visualization types data is received, either unsolicited or in response to a retrieval from or query to a local or remote database, such as from data structure 342 or system data structure 380, or some combination. The visualization types data indicates the visualization types and the instructions to generate each visualization type from the samples or metrics as well as the visualization rate for a real-time update period. This information is available for example in field 386 of configuration type record 308, and in field 387 in configuration type record 308 or configuration instance record 309, described above. Information about the native interactions with the sensors 350 is not needed because that information is confined to the sensing module 310; and, the visualization module 340 is insulated from needing that information.

In step 711, it is determined whether it is time to present the next visualization. If not, or if the time to compute the next visualization is not known, then control passes to step 721. In step 721, the number of visualizations to be presented per real-time update period is determined. For example, this value is read from field 387 in a configuration type record 308 or configuration instance record 309. In some embodiments, under some conditions such as upon start up, the maximum throughput of the visualization presentation is determined, including the time to retrieve any metrics from the metric data structure 334 and retrieve any samples from sample data structure 324, and the time to present the visualization, and the actual visualization maximum throughput is stored in field 387 of configuration instance record 309. Then the visualization rate for the real-time update period is determined based on the relative rates of sampling, storing and metric computation, and the real-time update period and the number of processors available. The newly determined actual visualization rate is then stored in field 387 of configuration instance record 309. Control then passes to step 731.

In step 731, it is determined whether end conditions are satisfied. If so, the process ends. Otherwise, control passes back to step 711 described above.

If it is determined in step 711 that it is time to present the next visualization, then control passes to step 713. In step 713, samples, if any, are retrieved from sample data structure 324 on storage 322 and, if encrypted, are decrypted. In step 715, metrics, if any, are retrieved from metric data structure 334 on storage 322 and, if encrypted, are decrypted. In step 717, the visualization is prepared and presented on display device 304. Control then passes to step 731 to determine if end conditions are satisfied, as described above.

Advantages of system 300 are at least twofold. One, any new sensing or metric technology can be incorporated without putting the burden on the medical researcher. The same modules can be used with a new technology just by changing the initialization, e.g., in system data structure 380. Two, the system simplifies the design of a patient monitoring application and lets medical researchers focus their work on their research contribution, such as developing new metrics. To use a Computer Science analogy, system 300 is like an Operating System, in contrast to current sensor-based medical research systems which are like writing drivers from scratch.

The metric, sample, and command identifiers contain the core information of the system. They can contain any information that can be interpreted by the receiving system component. For example, a sample can contain ASCII values so that it is human readable and is then converted when the sample is analyzed or it could be raw byte values that are interpreted when analyzed. There is understanding between the definition of a sample and its analysis. The same goes for commands and metrics, although it is typical that a metric will be human readable as this is often what is visualized.

It is even possible to have many different sensing modules 310 running in parallel and in many different locations.

2. EXAMPLE EMBODIMENTS

Example embodiments of the patient condition system 300, are described here for pressure injury (commonly known as bed sores) monitoring and prevention (PIMAP).

In the example embodiment, PIMAP is an Open-Source patient monitoring system that operates autonomously and continuously and integrates sensing, data collection and storage, as well as data analysis and visualization in a single system. PIMAP was built on UDP protocols and Opens source Kafka calls. Kafka is a distributed data-store based on the publish-subscribe model, but when interacting with the PIMAP-Store the developer does not need to know how to interact with Kafka as this is all embedded when using the PIMAP-Store object.

In the example embodiment, the sensing module 310 is called PIMAPSense and is implemented as PIMAP-Sense-UDP, which on each call reads UDP packets that are sent to its interface. In this configuration, a clinical trial can be run with several devices on several different patients sending data via UDP to an endpoint, PIMAP-Sense-UDP. Also implemented were PIMAP-Store-Kafka, PIMAPAnalyze-Objective-Mobility, and PIMAP-Visualize-Plt-Graph.

Performance of the example embodiment shows that the system is adaptable to low, medium and high throughput with low end to end latency. To show the relationship to the system 300, action described below are related to elements in the system 300 or to steps in flow charts 400 or 500 or 600 or 700, or some combination.

2.1 PIMAP Embodiment

There are physical limitations based on the software and hardware where PIMAP is being run. To evaluate these limitations a profiling methodology was developed. PIMAP is profiled by analyzing the throughput each component can handle in isolation. The profile is not an absolute limit, but instead an estimate. In this discussion of the implementation, decisions made for each component we will also discuss our methods on profiling each component. All throughputs are reported in PIMAP-samples metrics per second. In addition, there is a benefit for the PIMAP system to monitor itself so that it can adapt to different situations. For this reason each component has a parameter that can be set to generate PIMAP-samples that report on information relevant to each component. This parameter is called system-samples herein. Profiling experiments were performed to determine how rapidly each operation can be performed in order to determine advantageously large throughputs from end to end.

UDP tools in existence were leveraged to make the PIMAP-Sense-UDP component. Essentially this component is a multi-process server that listens on a given host and port. The number of server processes employed is user configurable. For evaluation purposes, three server processes were used as no substantial benefit was found by increasing this number on the systems profiled.

Upon initialization, the UDP servers in module 310 are started and each process listens for incoming UDP packets sent to the given host and port from sensors 350. Upon receipt of a UDP packet the packet is checked for PIMAP data; and, if there is PIMAP data, then the data is added to a shared queue 312. Upon each call to PIMAP-Sense-UDP.sense( ) from module 320, the shared queue 312 is queried until empty and the queried PIMAP-data from the queue is returned to module 320. This method of sensing data works both in low throughput and high throughput scenarios.

To profile PIMAP-Sense-UDP, one process that sends PIMAP-samples as quickly as possible in a loop was run. In a separate process PIMAP-Sense-UDP was initialized and PIMAP-Sense-UDP.sense( ) was called as quickly as possible. Upon initialization of PIMAPSense-UDP, system-samples was set to True. As of this writing, system-samples for the PIMAP-Sense-UDP component includes the throughput, the amount of PIMAP data (could be PIMAP-samples or PIMAP-metrics, but typically would be PIMAP-samples). To profile, the throughput values in the system-samples outputted were monitored and averaged over the length of time profiled. The results of profiling can be seen in Table 1, expressed in terms of PIMAP samples per second or metrics per second, (samples/metrics per second) depending on which is applicable for a given row. Each row indicates one of the operations or interactions by one or more of the modules 310, 320, 330 and 340 for this embodiment. The profiling of UDP packets with sensor data is shown in the UDP.sense( ) line of Table 1.

TABLE 1

PIMAP profiling on three computer systems (samples/metrics per second).

| operation | iMac 2010 | System 76 Oryx Pro | Raspberry Pi 2 |
|---|---|---|---|
| PIMAP-Sense-UDP.sense( ) | 3,555 | 49,000 | 1,217 |
| PIMAP-Store-Kafka.store( ) | 38,780 | 100,200 | 3,527 |
| PIMAP-Store-Kafka.retrieve( ) | 102,700 | 90,840 | 4,275 |
| PIMAP-Analyze-Objective-Mobility.analyze( ) In | 3,588 | 10,000 | 15.20 |
| PIMAP-Analyze-Objective-Mobility.analyze( ) Out | 7,192 | 20,010 | 35.00 |
| PIMAP-Visualize_Plt-Graph.visualize( ) | 6,653 | 1,329 | 338.0 |

The PIMAP-Store component is divided into two interfaces, PIMAP-Store.store( ) and PIMAP-Store.retrieve (sampletype or metric_type), which fits naturally into Kafka as PIMAP-Store-Kafka.store( ) corresponds to a producer, and PIMAP-Store-Kafka.retrieve(topic) corresponds to a consumer. Kafka has the added benefit that data can be distributed across multiple sites (multiple brokers). As PIMAP is written in Python the confluent-kafka Application Programming Interface (API)] was leveraged. A Kafka broker is setup independently of PIMAP, but this is relatively easy for a developer to do (or, for a price, a Cloud based service can be used). To store data into PIMAP-Store-Kafka the PIMAP data given as input is added to Kafka's producer queue and the topic is set based on the sample_type or metric_type respectively. The patient_id is used as the key and the PIMAP-sample/metric is used as the value. This method of storing data works well in both low throughput and high throughput scenarios.

To retrieve data from PIMAP-Store-Kafka, a consumer was created per topic requested, where the topic is the sample_type or metric_type. There are two parameters, the number of messages and timeout, for the Kafka consumer that greatly affects the low throughput and high throughput scenarios. The number of messages and timeout parameter of Kafka are interrelated. When a consumer requests a topic from Kafka it will return the data either when the number of messages is reached or a timeout occurs. In a low throughput scenario the number of messages should be set low to achieve a low latency and not unnecessarily wait for a timeout. In a high throughput scenario the number of messages ideally would be set where the number of messages is reached right before a timeout occurs to achieve the highest throughput. To handle both of these scenarios, in the illustrated embodiment, the timeout was fixed at 100 milliseconds (ms) and the number of messages was adjusted based on whether a timeout occurred. If a timeout occurs, the number of messages for the next PIMAP-Store-Kafka.retrieve(sample_type or metric_type) call was adjusted to be half of the current value, where the adjusted value is still an integer. If a timeout does not occur and the messages retrieved are greater than or equal to the value of the number of messages parameter, then the current value of number of messages was doubled. This is a simple adaptive way to handle both low throughput and high throughput scenarios and the results can be seen in the performance described in the next subsection.

To profile PIMAP-Store-Kafka the PIMAP-Store-Kafka.store( ) interface was profiled separately from the PIMAP-Store-Kafka.retrieve(sample_type or metric_type). To profile PIMAP-Store-Kafka.store( ) PIMAP-Store-Kafka was initialized to output system-samples and store as many PIMAP-samples as possible in a given amount of time and analyze the system-samples that are generated. The system-samples generated by the PIMAPStore-Kafka.store( ) interface includes the throughput, the amount of samples stored every second, as well as the Kafka producer queue length. The throughput was averaged over the given length of time of the experiment. The profiling results is shown in Table 1 in the line labeled PIMAP-Store-Kafka.store( ).

To profile the PIMAP-Store.retrieve(sample_type or metric_type) interface, the samples that were sent previously in the profile of PIMAP-Store.store( ) were retrieved and the system-samples generated by the PIMAP-Store.retrieve (sample_type ormetric_type) interface were monitored. The system-samples generated by the retrieve interface includes the throughput, the amount of data retrieved every second, the number of messages Kafka parameter, the actual number of messages retrieved, and the timeout Kafka parameter. The throughput reported in system-samples was averaged over the length of the experiment. The results of profiling can be seen in Table 1 in line labeled PIMAP-Store-Kafka.retrieve( ).

As an example metric determined in module 330, Objective Mobility, described in a separate application and based on multiple pressor sensors as sensors 350, was used. For purposes of this embodiments, it is sufficient to state that objective mobility indicates the amount of movements a patient has made during a time period. PIMAP-Analyze-Objective-Mobility is completely written in Python and takes advantage of numpy's libraries as well as Python's map utility to perform parallel calculations as often as possible. To improve performance in the PIMAP system to handle both low throughput and high throughput scenarios, an aggregation buffer was added in the illustrated embodiment as data structure 324, which buffer must be filled or a timeout must occur before data is analyzed. In a low throughput scenario, to achieve low latency, the aggregation buffer limit is advantageously small so that time is not wasted waiting for the timeout. In a high throughput scenario, it is advantageous for the aggregation buffer limit be as close to amount filled by the timeout, so as to make use of the parallelizability of PIMAP-Analyze-Objective-Mobility.

The system-samples of PIMAP-Analyze-Objective-Mobility monitors the throughput of samples from structure 324 into the module 330, the throughput of the metrics out of the module 330 into data structure 334, the length of the aggregation buffer 324, the aggregation buffer limit, and the time to analyze the PIMAP-samples to fill structure 334. To profile this component, as many pressure bandage PIMAP-samples as possible were sent in a loop from structure 324, and the system samples (metrics) generated were monitored, in particular the throughput in from 324 and the throughput out to structure 334. Those values were then averaged over the length of time the experiment is run. The results of profiling can be seen in Table 1 in the lines labeled PIMAP-Analyze-Objective-Mobility.analyze( ) In and PIMAP-Analyze-Objective-Mobility analyze( ) Out, respectively.

For an example visualize module 340, the matplotlib Python library, a common library used to display data, was leveraged. The example embodiment focuses on graphing data over time. Often when data is visualized in this way, one can observe phenomena that would otherwise be unnoticed when looking at a single value. An example of this is the difference between a time-lapsed photograph and video of the night sky. In the time-lapsed photograph the stars appear as streaks in the sky, whereas a video depicts the stars moving across the sky as the Earth rotated. In this embodiment, module 340 is called PIMAP-Visualize-Plt-Graph. To make it adaptive, an aggregation buffer 342 was used, similar to the buffer 332 used in PIMAP-Analyze-Objective-Mobility. The example module 340 uses parameters that include a limit on the amount of data that can be displayed, and an update period, which determines how often data is displayed. In a low throughput scenario, the aggregation buffer limit should be set low, so as to not have to wait for a timeout. In a high throughput scenario, the aggregation buffer limit should be set close to the amount that is filled in the time it takes to timeout. The visualization adds an extra layer of complexity, when compared to analyze functions of module 330 alone, because through experimentation, it was found that the time to process the data to be displayed, as well as the time it takes to display the data, can be significant. Thus, if too much data is aggregated, then the data cannot be processed and plotted in less than the update period.

To handle this in the experimental embodiment, the time to process data and the time to plot data were set to be a fraction of the update period. For this experiment, the time to process data was configured to be 40% of the update period, and the time to plot data was configured to be 40% of the update period. The remaining 20% of the update period is spent aggregating data. If the time to process data is above this percentage, then the aggregation limit was divided in two, so that on the next update there is at most half as much data to process. If the time to process data is below the given percentage, and more data was being aggregated than the aggregation limit, then the aggregation limit was increased by the amount of data aggregated. Likewise, if the time to plot data is above the plot percentage, then the amount of data to be displayed was divided by two. If the time to plot data is above this plot percentage, then the amount of data we can display was increased by the amount of data processed on the last update. If the total amount of data to be displayed is greater than the limit of data to be displayed the total data was down-sampled. This means that one has to wait until the total data is twice as big as the display limit to down-sample by 2, three times as big to down-sample by 3, and so forth.

The system-samples parameters of PIMAP-Visualize-Plt-Graph contains the throughput, how much PIMAP data is processed a second, latency, the average time from when data was sampled to when it was processed for visualization, the aggregation limit, the display limit, the refresh period, the time to process data, and the time to plot data. To profile this visualize component, as many PIMAP samples as possible were visualized in a loop while gathering the values of the system-samples parameters, and the throughput was averaged over the length of the profile experiment. The results of profiling can be seen in Table 1 in the line labeled PIMAP-Visualize_Plt-Graph.visualize( ).

2.2 PIMAP Performance

To evaluate PIMAP's features and performance, a variety of experiments were run including: (1) evaluating PIMAP's performance in low-, medium-, and high throughput scenarios to demonstrate that PIMAP has low end-to-end latency from the time data is sampled to the time data is visualized regardless of throughput; (2) demonstrating PIMAP's ability to integrate new sensors, e.g., a custom skin health sensor; (3) connecting PIMAP to a sensor network simulation platform (COOJA) to evaluate PIMAP's ability to handle a large number of sensors; and (4) demonstrating how PIMAP can be used to analyze and visualize data in real-time by playing back data obtained from a wearable pressure bandage.

2.2.1 Low Latency at Low, Medium and High Throughput

End to end latency is defined as the time the data is sampled to the time it is visualized, when running PIMAP. In addition to the end to end latency, the way PIMAP adapts to low, medium, and high throughput scenarios is also monitored, which is the way adjustments are made to the aggregation limit for PIMAP-Analyze-Objective-Mobility, the number of messages for PIMAP-Store-Kafka retrieve, and the aggregation limit and display limit for PIMAP-Visualize-Plt-Graph.

For this performance embodiment, PIMAP, including Kafka, is configured locally on one computer, an iMac 2010 with sensor connections over a local network. Based on the profiling seen in Table 1, the limiting throughput is PIMAP-Sense, which is a little over 3,500 PIMAP samples per second (sample/s). In some embodiments, system parameters for an configuration are chosen automatically to avoid exceeding this limit. Based on this limit, a low throughput scenario is determined to be 1 sample/s, a medium throughput scenario to be 100 PIMAP samples/s, and a high throughput scenario to be 1,000 PIMAP samples/s. Each experiment was run for ten minutes; and, an average end to end latency for the low throughput scenario was found to be 20.0 ms, for the medium throughput scenario found to be 203 ms, and for the high throughput scenario found to be 411 ms. From this, one can see that the latency does not scale linearly with sample rate and is closer to logarithmic and even at a high sample rate of 1,000 samples/s latency stays below 500 ms.

Figure 11A:
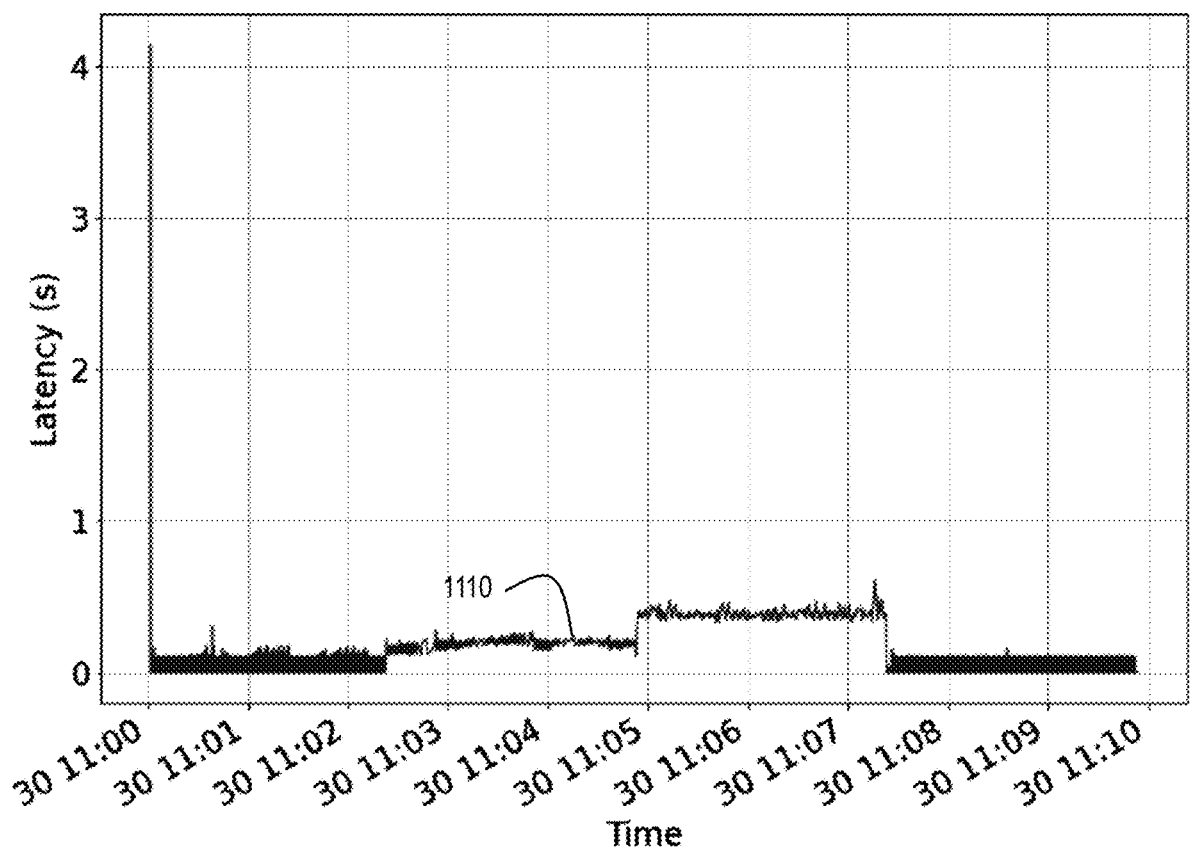
FIG. 11A, FIG. 11B and FIG. 11C are plots that illustrate example time series of adaptive system parameter values with time in response to changes in sensor sending rates for end-to end latency, aggregation and retrieved sensor data, respectively, according to an experimental embodiment.
Figure 11B:
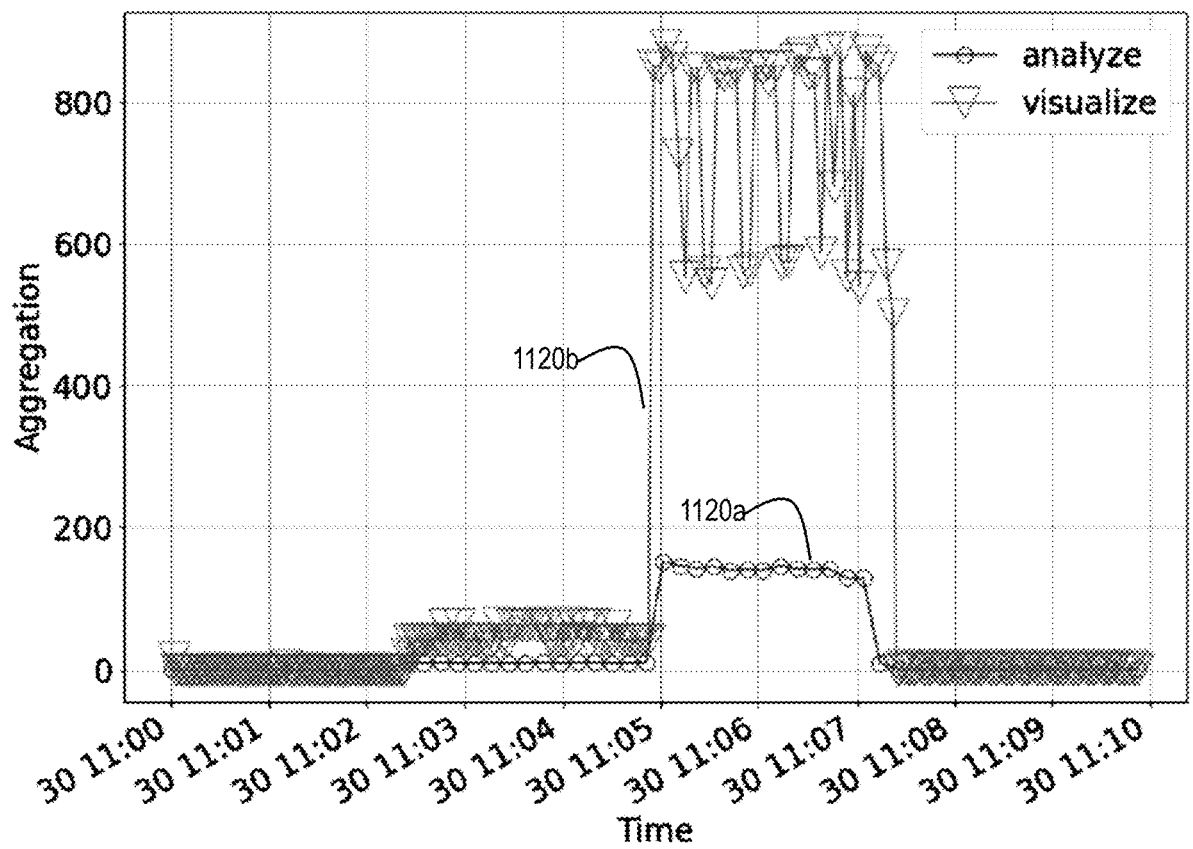
Figure 11C:
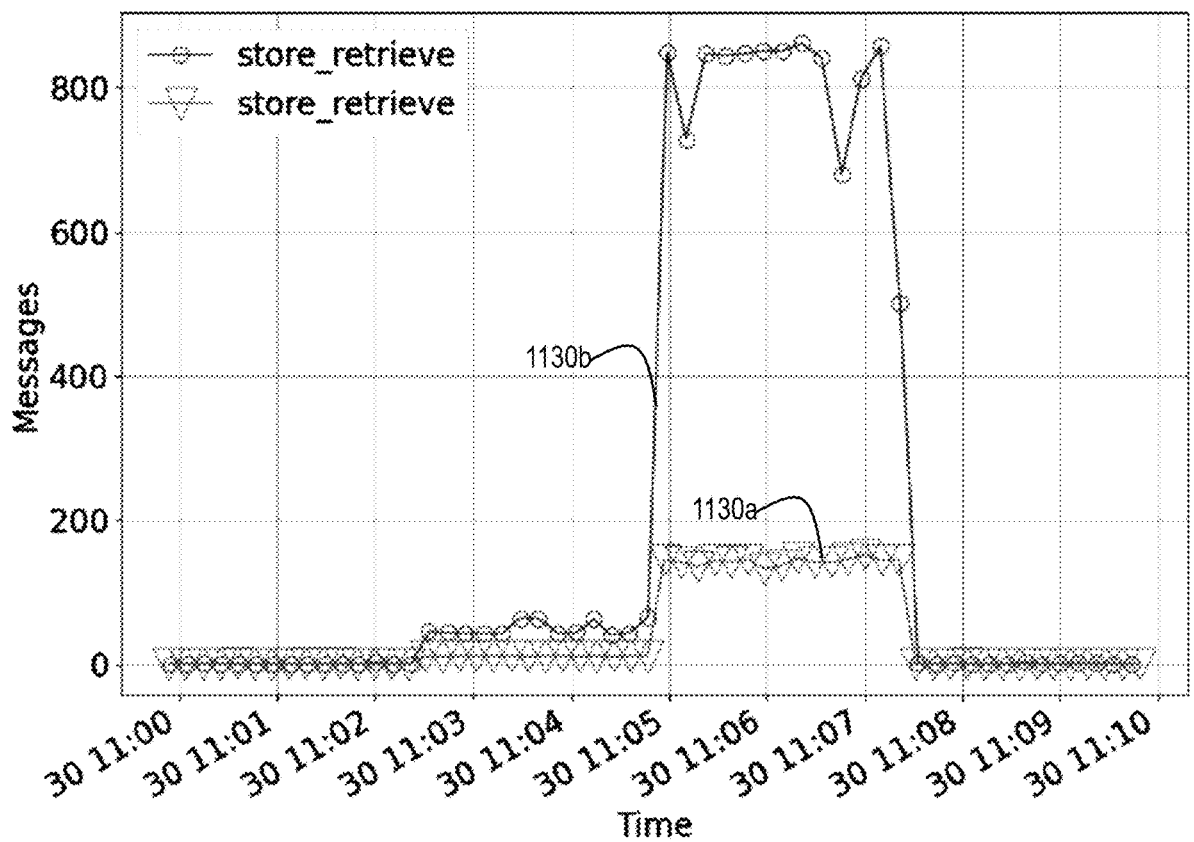

To demonstrate the adaptiveness of PIMAP, an additional experiment was run in which the throughput was modified during the experiment. The same hardware setup was used as in the previous experiment and for two and a half minutes sensors sent data at a low throughput of 1 sample/s, the next two and a half minutes sensor sent data at a medium throughput of 100 samples/s, the next two and a half minutes sensor sent data at a high throughput of 1,000 samples/s, and for the final two and a half minutes sensors sent data at a low throughput of 1 samples/s. FIG. 11A, FIG. 11B and FIG. 11C are plots that illustrate example time series of adaptive system parameter values with time in response to changes in sensor sending rates for end-to end latency, aggregation and retrieved sensor data, respectively, according to an experimental embodiment. One can see clearly that the divisions in sample rate cause an adjustment in each adaptive system parameter.

In FIG. 11A, the horizontal axis indicates time in hours:minutes on day 30; and the vertical axis indicates end-to-end latency in seconds. In the first time period from 0 to 2.5 minutes and in the fourth time period from 7.5 to 10 minutes, sensor data rate is low. In the second time period from 2.5 to 5 minutes, the sensor data rate is medium; and, in the third time period from 5 to 7.5 minutes, sensor data rate is high (all senor data rates are below the sensor module throughput limit for the computer system as determined by profiling). The trace 1110 indicates the measured latency. It is low for low sensor rates and step for the higher sensor rates. At all time periods, the latency is less than about 0.5 seconds, which is suitable for many embodiments that monitor a patient's condition. In FIG. 11B, the horizontal axis indicates time in hours:minutes on day 30; and the vertical axis indicates aggregation buffer size in relative units. The four time periods are as described above with reference to FIG. 11A. The trace 1120a indicates the aggregation for the analysis step and trace 1120b indicates the aggregation for the visualize step, Both are low at low sensor rates, to reduce latency, and step up at middle sensor rates and maximum at high sensor data rates to avoid losing data. Aggregation is much larger for visualization (about 800) than for analysis (about 150) at the high sensor rates during minutes 5 through 7.5. In FIG. 11C, the horizontal axis indicates time in hours:minutes on day 30; and the vertical axis indicates number of packets 200 to store or retrieve data from data buffer 324. The four time periods are as described above with reference to FIG. 11A. The trace 1130a indicates the packets for the store step and trace 1130b indicates the packets for the retrieve step, 324. Both are low at low sensor rates, and step up at middle sensor rates and maximum at high sensor data rates. The number of packets is much larger for store than for retrieve as down-sampling occurs at the high sensor rates during minutes 5 through 7.5.

2.2.2 Adaptable to Varying Sensor Types

Embodiments, including PIMAP, allow for various types of sensors. Supporting only one type of sensor does not provide value to the majority of the patient monitoring community. Previous systems tends to provide such one off systems, which makes it difficult to reuse existing implementations and expand to different patient conditions or new sensor types. To support a large variety of types of sensors, guidelines on what type of data can be sent in a PIMAP-sample are very forgiving. So far in our development we have not encountered data that we cannot encode in a PIMAP-sample or PIMAP-metric.

In various embodiments, sensor information of a PIMAP-sample is stored in the sample field. In an illustrated experimental embodiment, this field is a string representation of a dictionary. For example, pressure bandage data with no pressure applied, used in Objective Mobility analysis, can be converted to a string and looks as follows: "sample: {'pressure_bandage':'[[0,0,0,0],[0,0,0,0], [0,0,0,0],[0,0,0,0]]', 'pressure_bandage_units':'mmHg'}." The definition of the sample type and its storage/retrieval formats and methods are provided in step 401 and stored in configuration type record 308, such as in field 382. To pack or unpack the sample in a storage or retrieval operation, one can use as a method the built-in ast (Abstract Syntax Trees) Python library that can convert a syntactical grammar into its corresponding type. Another way data can be passed and converted, is using the built-in pickle Python library, by pickling data when inserting as a sample and unpickling when reading the PIMAP-sample for analyzing.

Figure 12A:
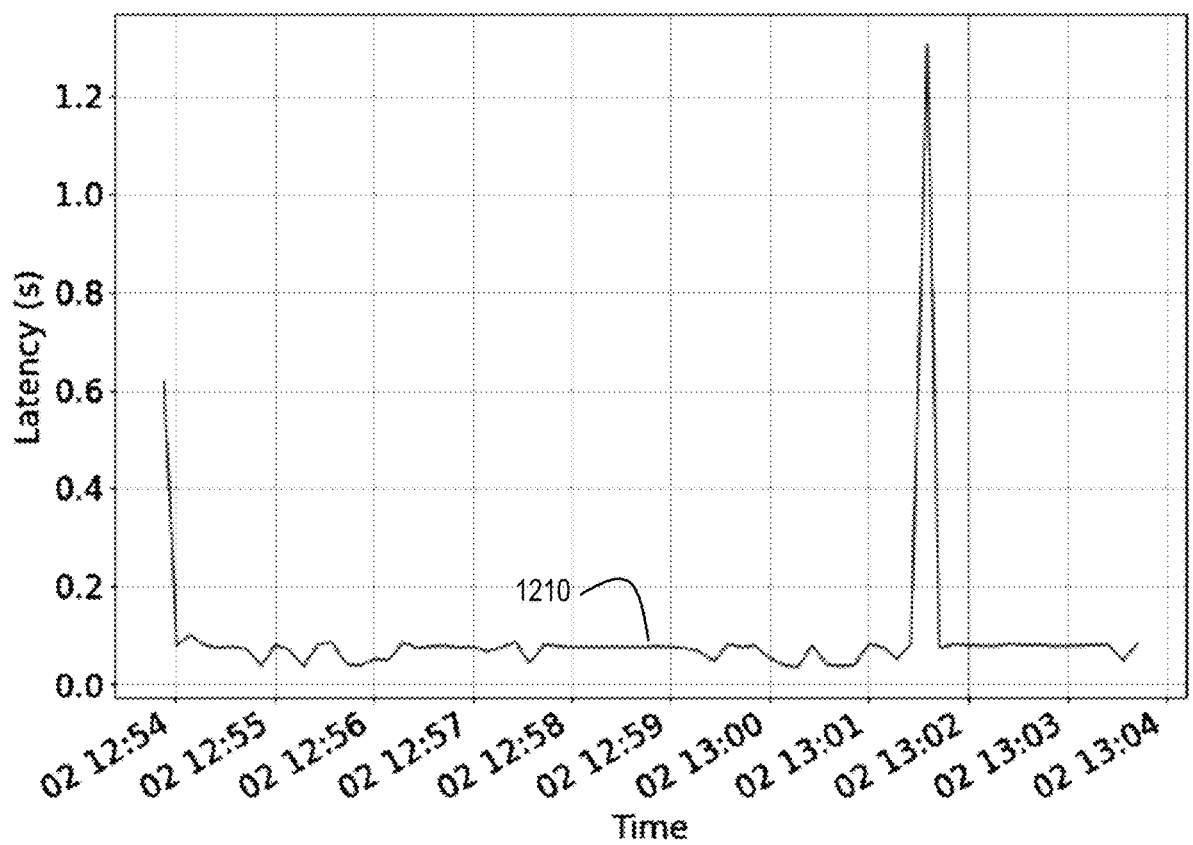
FIG. 12A and FIG. 12B are graphs that illustrate example system parameter values for the system modified to accept the new single Sentinel bandage sensor, according to an embodiment.
Figure 12B:
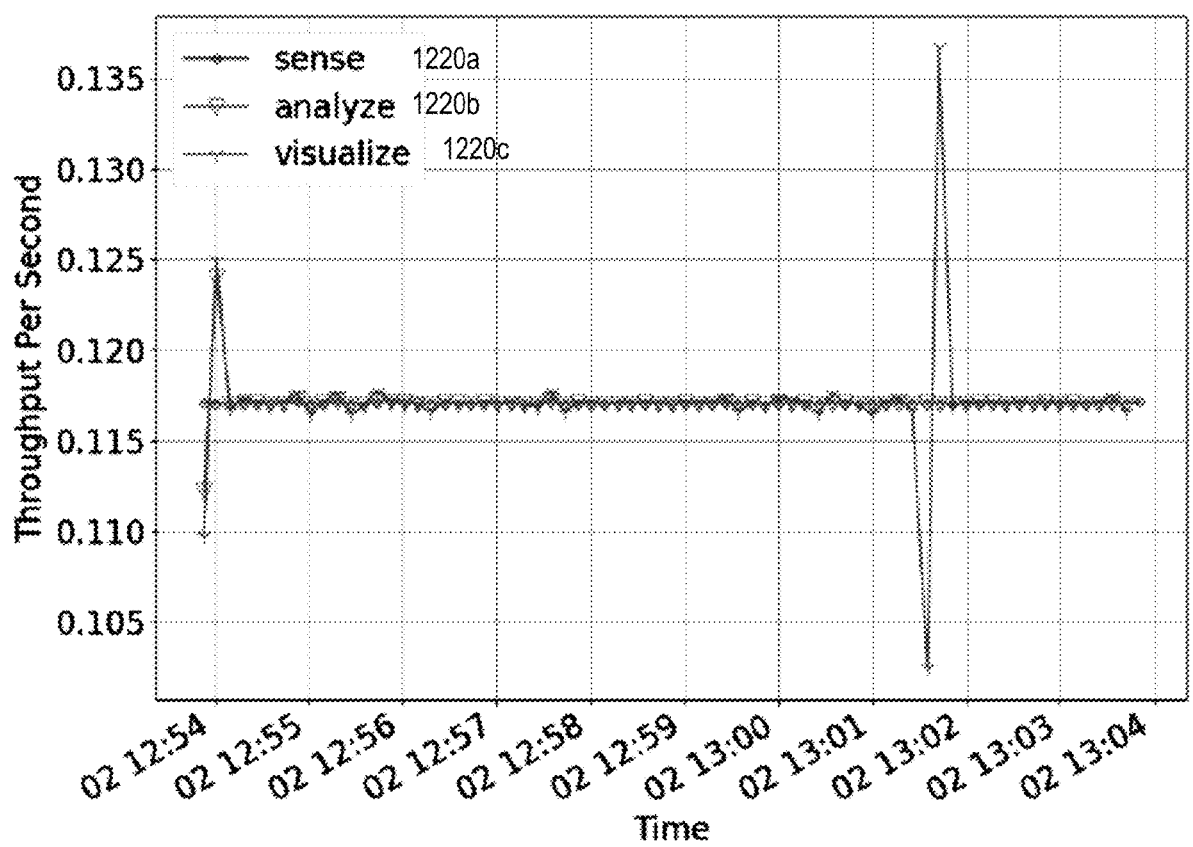

To demonstrate PIMAP's ability to incorporate new sensors with minimal programming, an new configuration gathered, analyzed, and visualized the impedance spectroscopy data from a new sensor—a single Sentinel bandage, which was obtained from University of California, San Francisco (UCSF). All tests were run on a single Linux laptop and on a local network. The Sentinel bandage generating impedance spectroscopy data was connected to the laptop via USB and a custom PIMAPSense component was written to read the serial data and convert it to a PIMAP-sample. The PIMAP-samples were analyzed using a modified PIMAP-Analyze component that converted the data into a PIMAP-metric that can be displayed using a heat map. Finally, a modified PIMAP-Visualize component that can display the heat map data was created. FIG. 12A and FIG. 12B are graphs that illustrate example system parameter values for the system modified to accept the new single Sentinel bandage sensor. In FIG. 12A the horizontal axis indicates time in day hours:minutes; and, the vertical axis indicates end-to-end latency in seconds. Trace 1210 shows that the end to end latency of the PIMAP system from the time data enters PIMAP via PIMAP-Sense to when it was visualized by PIMAP-Visualize mostly stays below 100 ms. In FIG. 12B the horizontal axis is the same as in FIG. 12A; and, the vertical axis indicates throughput in sample/metric packets per second. Trace 1220a shows throughput for the sense module 310, trace 1220a shows throughput for the analyze module 330, and trace 1220c shows throughput for the visualize module 340. One can see that the sample rate, the throughput of PIMAP-Sense is centered around 0.1175 PIMAP-samples a second or one PIMAP-sample roughly every 8.5 s.

In other embodiments, only the module 310 is written specifically for a particular arrangement of sensor types. In such embodiments, the modules 320, 330, 340 are written generically and the new sensor specific information is stored a new contents in fields 382, 384 or 386, or some combination, of a configuration type record 308.

2.2.3 Network Simulation

A well-known problem in sensor network deployment is testing whether the deployment can reliably send and receive data over the network. To deploy even as few as ten physical devices and test whether data can be collected is time consuming and difficult. To address this problem several sensor network simulators were developed. A well-regarded simulator is COOJA, which simulates ContikiOS nodes. ContikiOS is an operating system designed for low-power low-resource devices to connect to the Internet. Because this is a well-known problem, there is value in connecting PIMAP to COOJA in order to simulate various topologies and sensor device scenarios, so that future users of system 300 can leverage COOJA and use simulated networks with PIMAP. In the experimentation disclosed here, COOJA was not forced to run in real-time. Instead, a 100% speed limit was forced on the simulation. This still allows for the simulation to run slower than real-time. Therefore, the performance was only analyzed once data has entered PIMAP, because the time given by the simulated sensor node's clock was not stable.

As a proof of concept in COOJA, a network was setup with one border router and ten sensor devices that are all one hop from the border router. All sensor devices were using CSMA at the MAC layer, the standard contention based MAC protocol, and RPL at the routing layer. The border router is the sink of the topology—meaning all nodes will send packets to the border router if they do not have a route to the destined address. COOJA was running inside a Docker container, and PIMAP was running on the host machine. There is a tool part of the ContikiOS distribution called tunslip that connects to the border router and forwards packets onto the host network.

Figure 13:
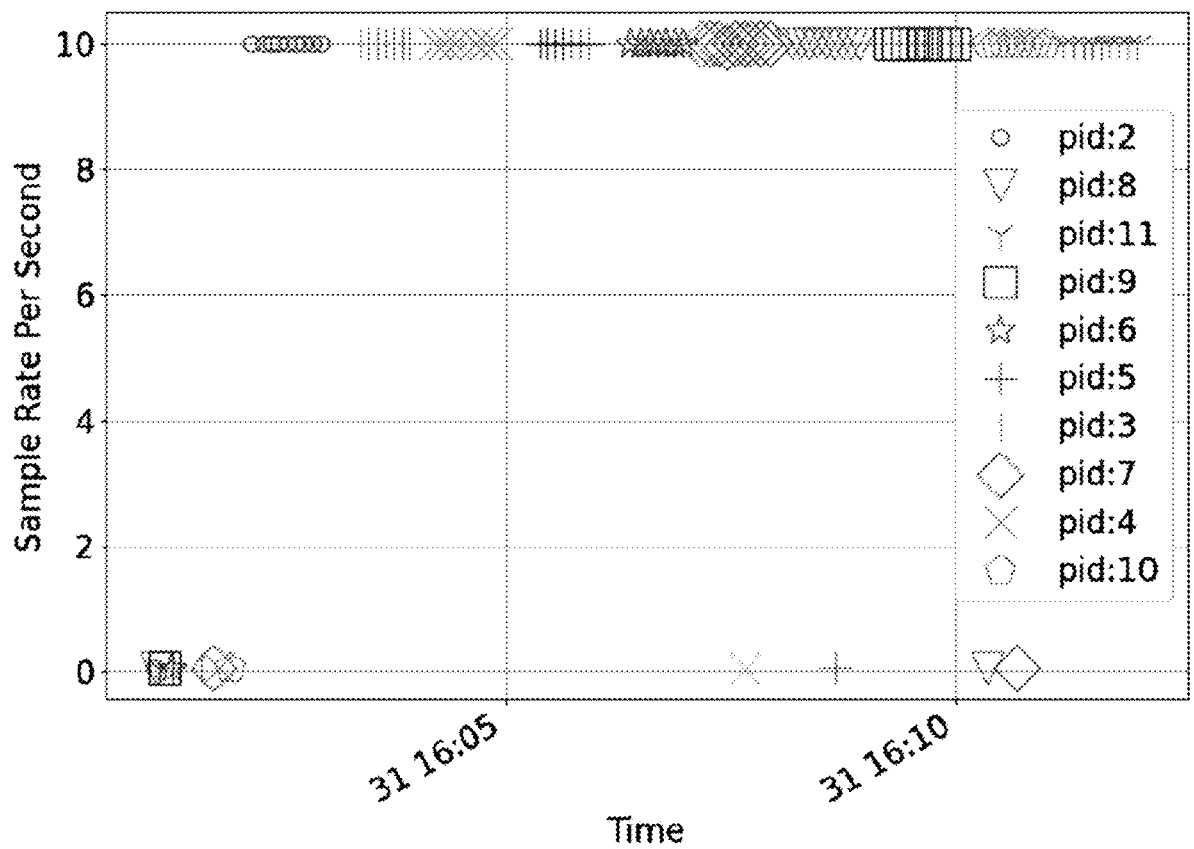
FIG. 13 is a graph that illustrates sensor sampling rate scheduled as a round robin among ten patients with patient-id values ranging from 2 through 11, according to an embodiment.

An application layer round robin schedule was performed to demonstrate the ability to use PIMAP to interact with COOJA and control the sample rate of the nodes. Initially all nodes sampling rates were set at 0.05 samples/s (one sample sent every 20 s The simulation ran for two minutes. After these two minutes, a PIMAP-command was sent in a packet 314 to the lowest value of patient-id to change its sampling rate to 10 samples/s; and commands were sent in other packets 314 to all other nodes to set their sampling rate to 0.05 samples/s. After running in this fashion for a minute, the change was repeated using the next lowest value of patient-id. FIG. 13 is a graph that illustrates sensor sampling rate scheduled as a round robin among ten patients with patient-id values ranging from 2 through 11, according to an embodiment. The horizontal axis indicates time in day hours:minutes; and the vertical axis indicates sensor sampling rate in samples per second. This is a simulation of an implementation of an application layer round robin scheduler.

PIMAP-Analyze-Sample-Rate was used as the sampling rate, which is an inferred sample rate analysis calculated by waiting until at least five PIMAP-samples have been received, using the timestamps of the PIMAP-samples, which in this case is the COOJA time (time starts at zero when the node starts), calculating the gradient of the timestamps and averaging the reciprocal of the gradient. In FIG. 13, each different patient-id value is represented by a different symbol as indicated in the legend. The simulated network performed as expected—with each patient in turn sending samples at the high rate of ten samples per second for one minute per turn.

2.2.4 Real-Time Analysis

For purposes of demonstrating the ability of the analysis calculations to occur in real-time and to demonstrate the use of PIMAP in a real-world clinical trial scenario, pre-collected data of pressure sensor data used in a previous Objective-Mobility analysis was used as if it were being collected in real-time and fed it into PIMAP. PIMAP, including Kafka, was configured locally on one computer with data received over a local network, as in previous simulations. Sensor data from five patients were simulated as if they were simultaneously in the trial in order to continually monitor the risk of all patients in real-time. The analysis is visualized in real-time as if it were presented to clinicians. The experiment was run for 24 hours.

Figure 14A:
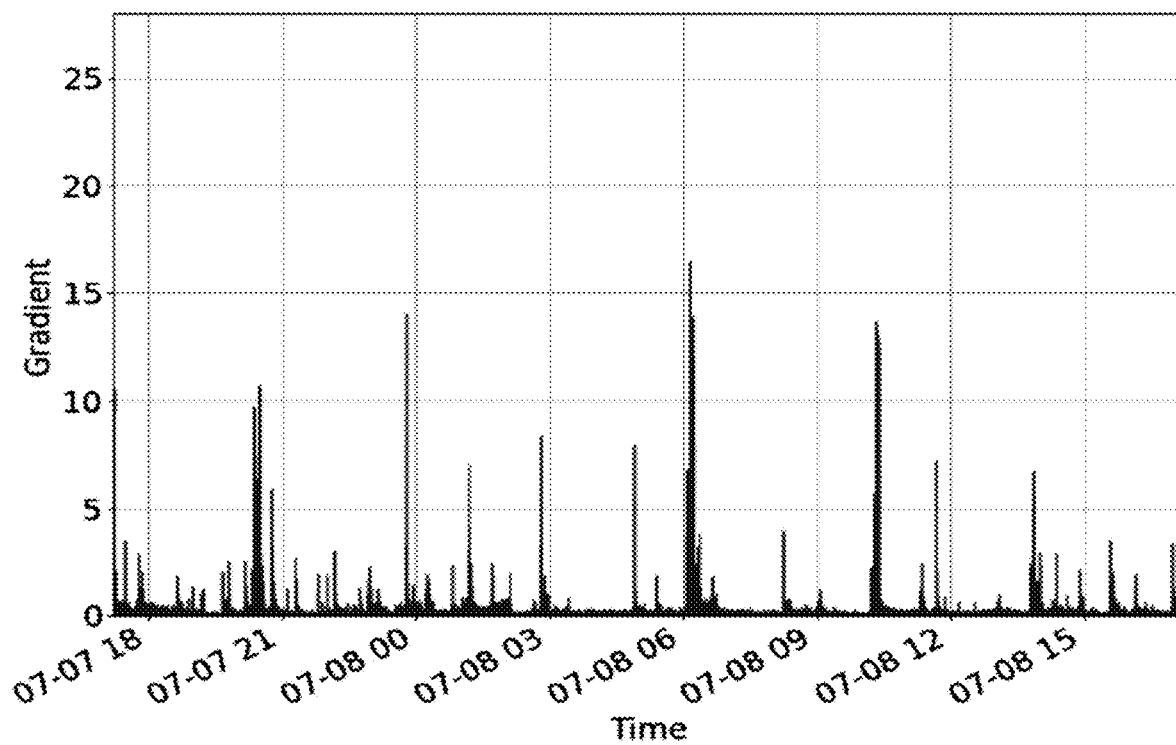
FIG. 14A and FIG. 14B are graphs that illustrate example time series of values of Gradient for two, respectively, of five patients over 24 hours, according to an embodiment.
Figure 14B:
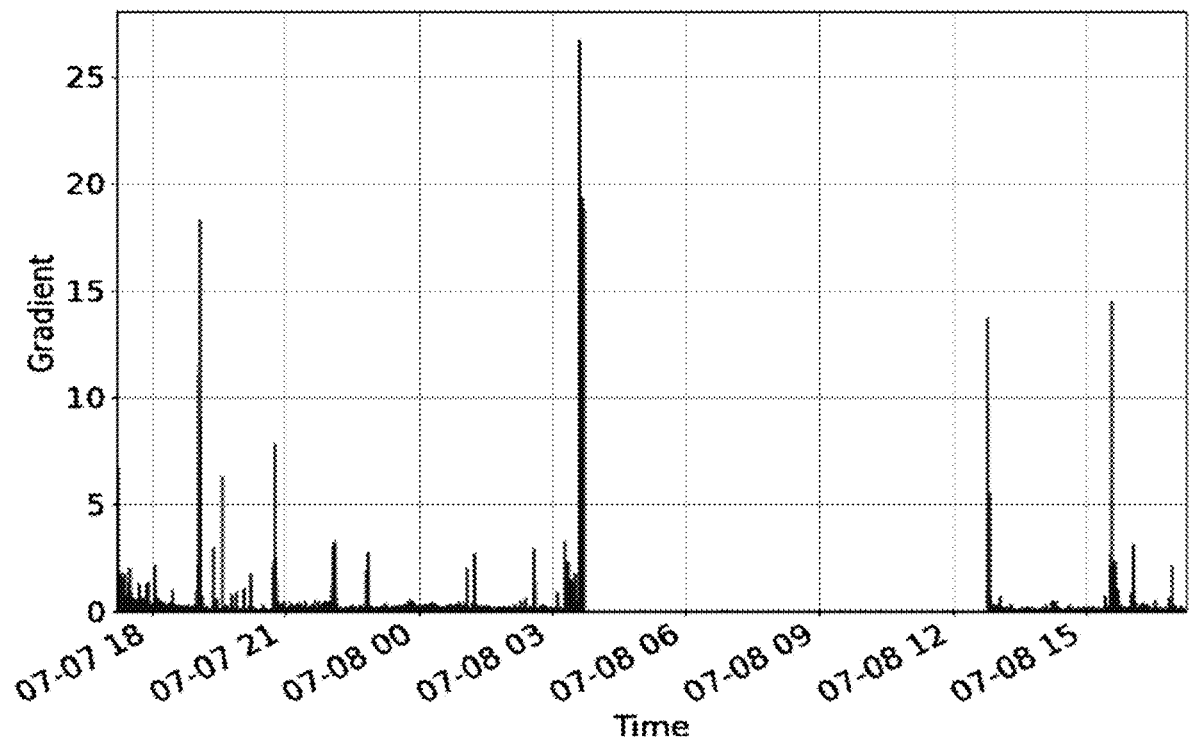
Figure 14C:
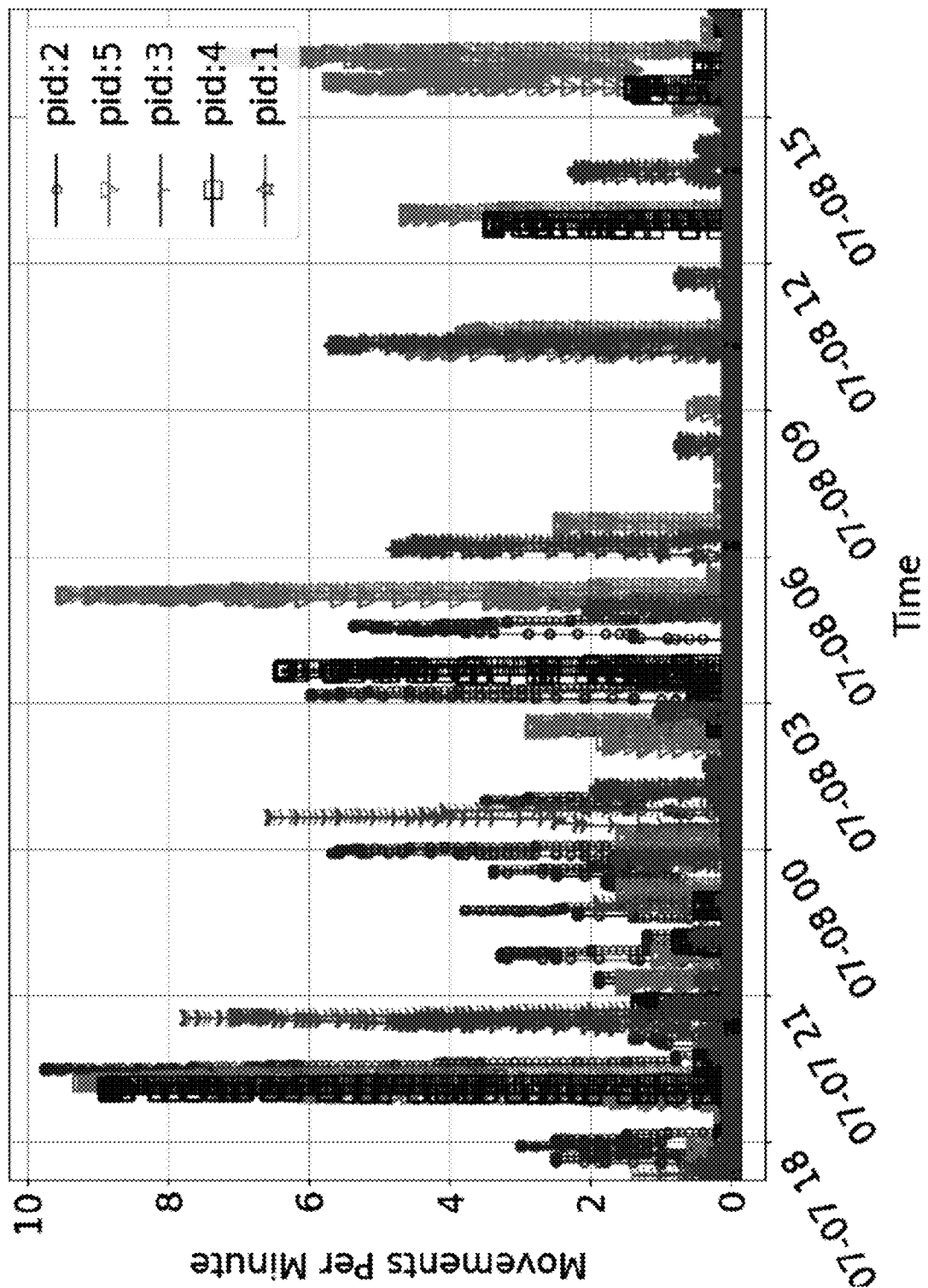
FIG. 14C is a graph that illustrates an example of a time series of values of movements per minute, a measure of risk of developing pressure injuries, according to an embodiment.

There are two metrics that are computed based on the pressure changes sensed in PIMAP and then visualized in the example embodiment, Gradient and Movements per minute. The Gradient, also called the xy-gradient, is the assessed amount of movement a patient makes combined from two directions, x and y, based on the changes in pressure sensed. The movements per minute is a measure, based on the Gradient metric for each patient, that indicates the risk that a particular patient will develop the condition being monitored, pressure injuries (e.g., bed sores). FIG. 14A and FIG. 14B are graphs that illustrate example time series of values of Gradient for two, respectively, of five patients over 24 hours, according to an embodiment. In each, the horizontal axis indicates time in month-day hour for a 24 hour window; and the vertical axis indicates Gradient value for that patient at that time. Each trace shows the gradient value for one patient over the 24 hour window. FIG. 14C is a graph that illustrates an example of a time series of values of movements per minute, a measure of risk of developing pressure injuries, according to an embodiment. The horizontal axis is the same 24 hour window as in FIG. 14A and FIG. 14B. The vertical axis is movements per minute. The movements of all five patients are combined, with each different patient indicated by a different symbol. The movements per minute metric is a risk assessment of which patients are moving the least, regardless whether the movement was clinic-assisted. As can be seen the risk changes over time. Graphs of Gradient like FIG. 14A or FIG. 14 for each of the five patients monitored and a graph of the risk stratification based on the patients' movements per minute are calculated and presented in real-time (i.e., within a time that has an acceptable latency) as described next.

Figure 14D:
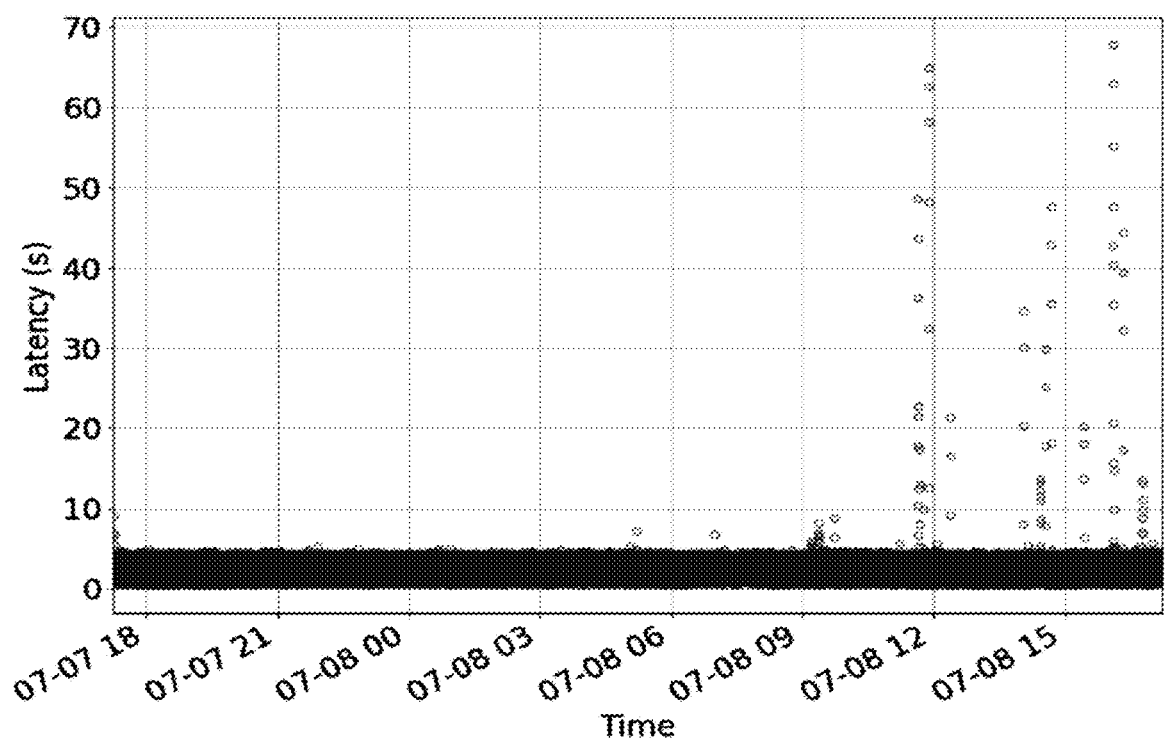
FIG. 14D is a graph that illustrates example values of latency in presenting the graphs of FIG. 14A and FIG. 14B among others for three remaining patients, according to an embodiment; and, FIG. 14E is a graph that illustrates example values of latency in presenting the graph of FIG. 14C, according to an embodiment.

FIG. 14D is a graph that illustrates example values of latency in presenting the graphs of FIG. 14A and FIG. 14B among others for three remaining patients, according to an embodiment. The horizontal axis is the same 24 hour window as in FIG. 14A, FIG. 14B and FIG. 14C. The vertical axis is latency in seconds to produce the five gradient plots, i.e., the latency is divided into the end to end latency of the gradient data to be displayed from when it was sampled. This xy-gradient calculation is set with a five sample delay, which in this case is a five second delay, and that is what is consistently seen in the latency results. The average latency of this experiment to display the xy-gradient across all patients is 2.42 s.

Figure 14E:
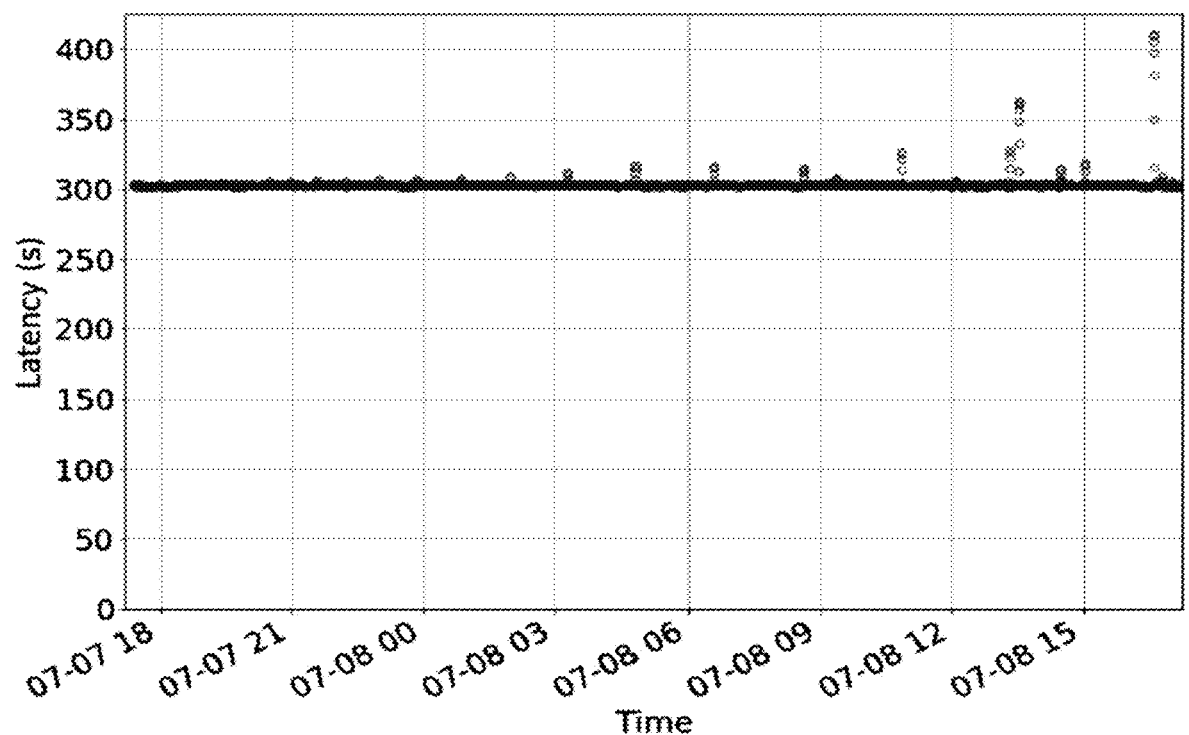

FIG. 14E is a graph that illustrates example values of latency in presenting the graph of FIG. 14C, according to an embodiment. The metric movements per minute is calculated after 600 PIMAP-samples are collected (ten minutes) and is a combination of the those samples so on average a five minute delay or 300 second delay can be seen in these results. The average latency of this experiment to display the movements per minute is 303 s.

3. COMPUTATIONAL HARDWARE OVERVIEW

Figure 8:
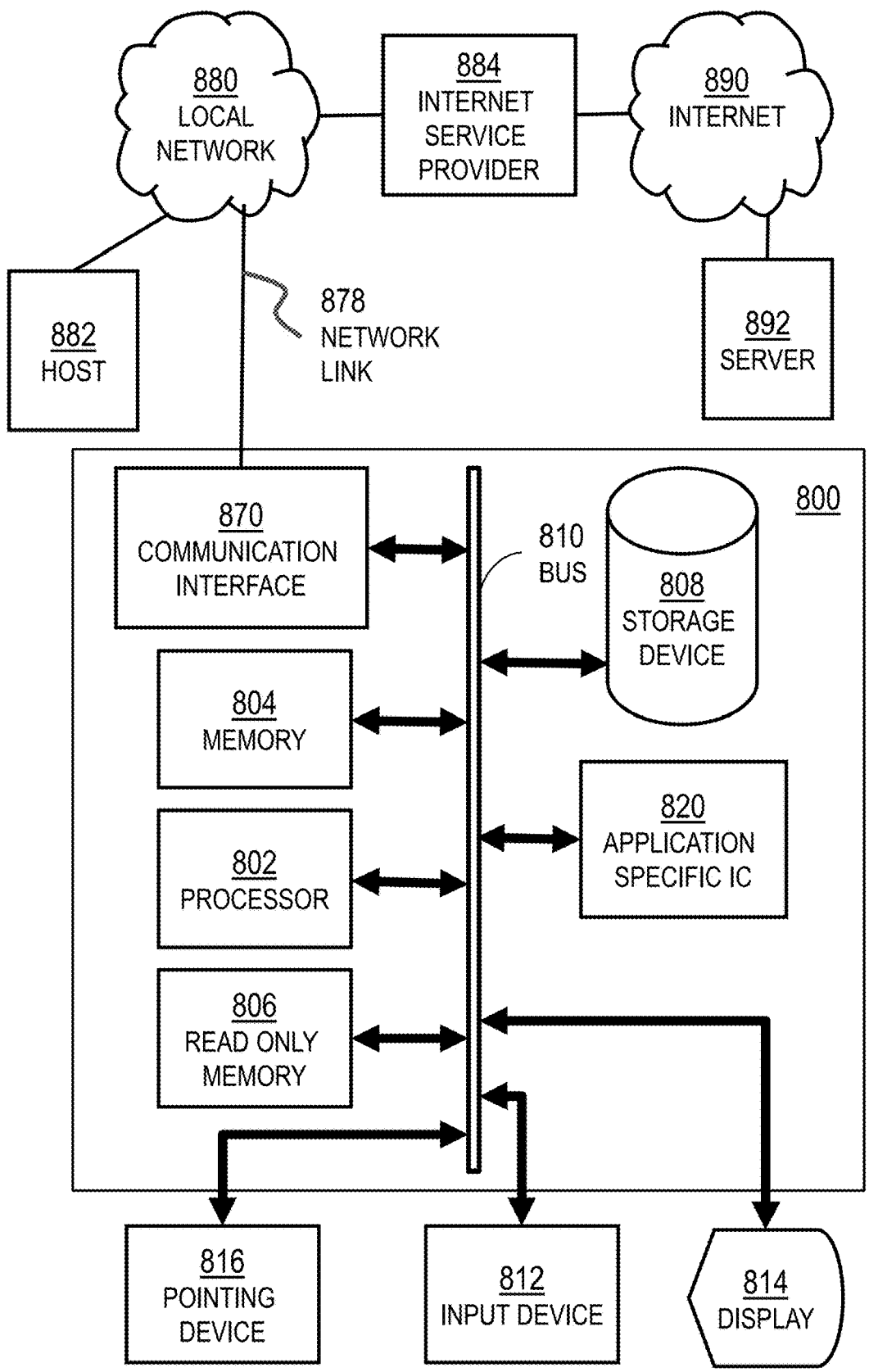
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein.

A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitutes computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk or optical disk, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into signals compatible with the signals used to represent information in computer system 800. Other external devices coupled to bus 810, used primarily for interacting with humans, include a display device 814, such as a cathode ray tube (CRT) or a liquid crystal display (LCD), for presenting images, and a pointing device 816, such as a mouse or a trackball or cursor direction keys, for controlling a position of a small cursor image presented on the display 814 and issuing commands associated with graphical elements presented on the display 814.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 870 sends and receives electrical, acoustic or electromagnetic signals, including infrared and optical signals, that carry information streams, such as digital data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 802, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 802, except for carrier waves and other signals.

Logic encoded in one or more tangible media includes one or both of processor instructions on a computer-readable storage media and special purpose hardware, such as ASIC 820.

Network link 878 typically provides information communication through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides information representing video data for presentation at display 814.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820, may be used in place of or in combination with software to implement the invention. Thus, embodiments of the invention are not limited to any specific combination of hardware and software.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in storage device 808 or other non-volatile storage for later execution, or both. In this manner, computer system 800 may obtain application program code in the form of a signal on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red a carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
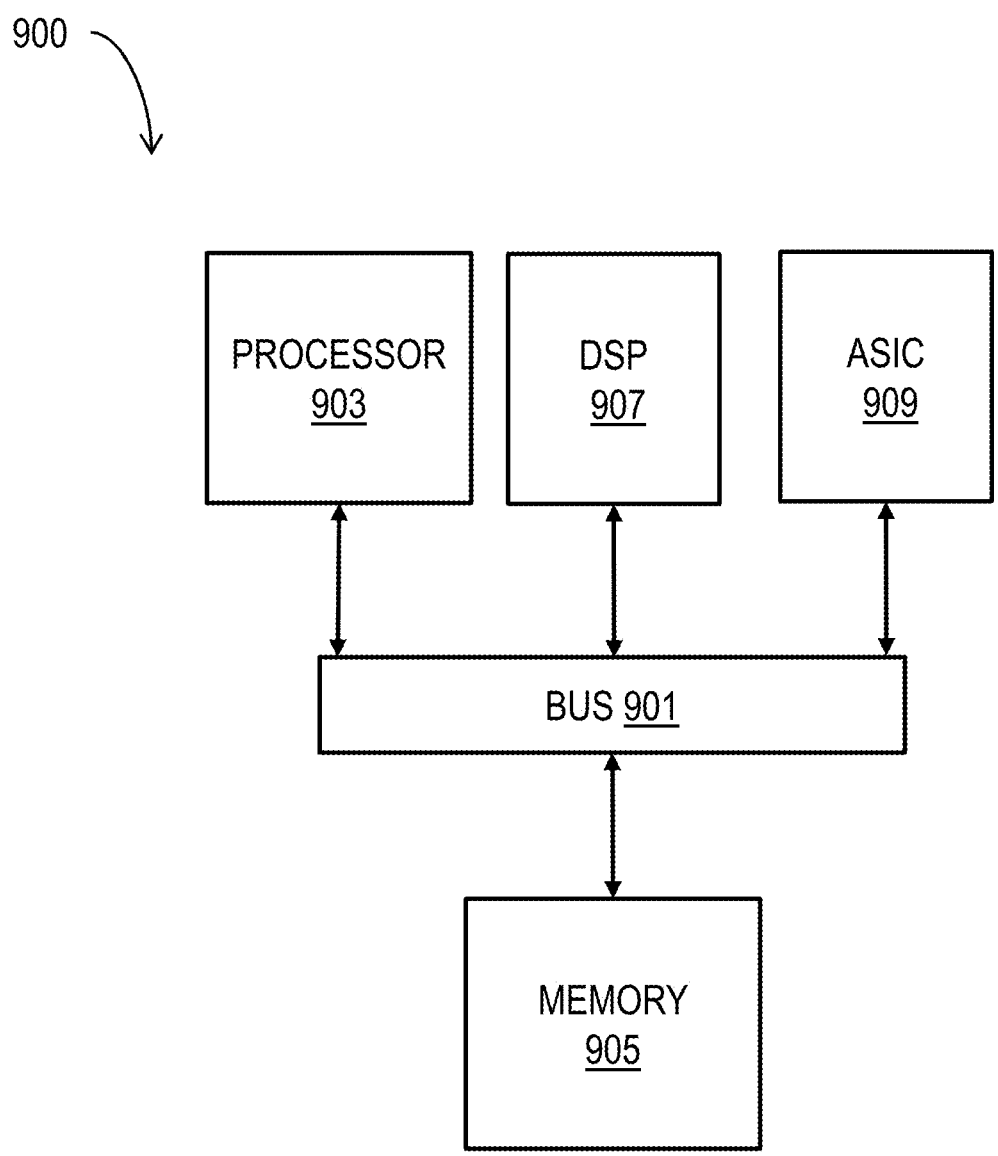
FIG. 9 illustrates a chip set upon which an embodiment of the invention may be implemented.

FIG. 9 illustrates a chip set 900 upon which an embodiment of the invention may be implemented. Chip set 900 is programmed to perform one or more steps of a method described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of a method described herein.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 905 also stores the data associated with or generated by the execution of one or more steps of the methods described herein.

Figure 10:
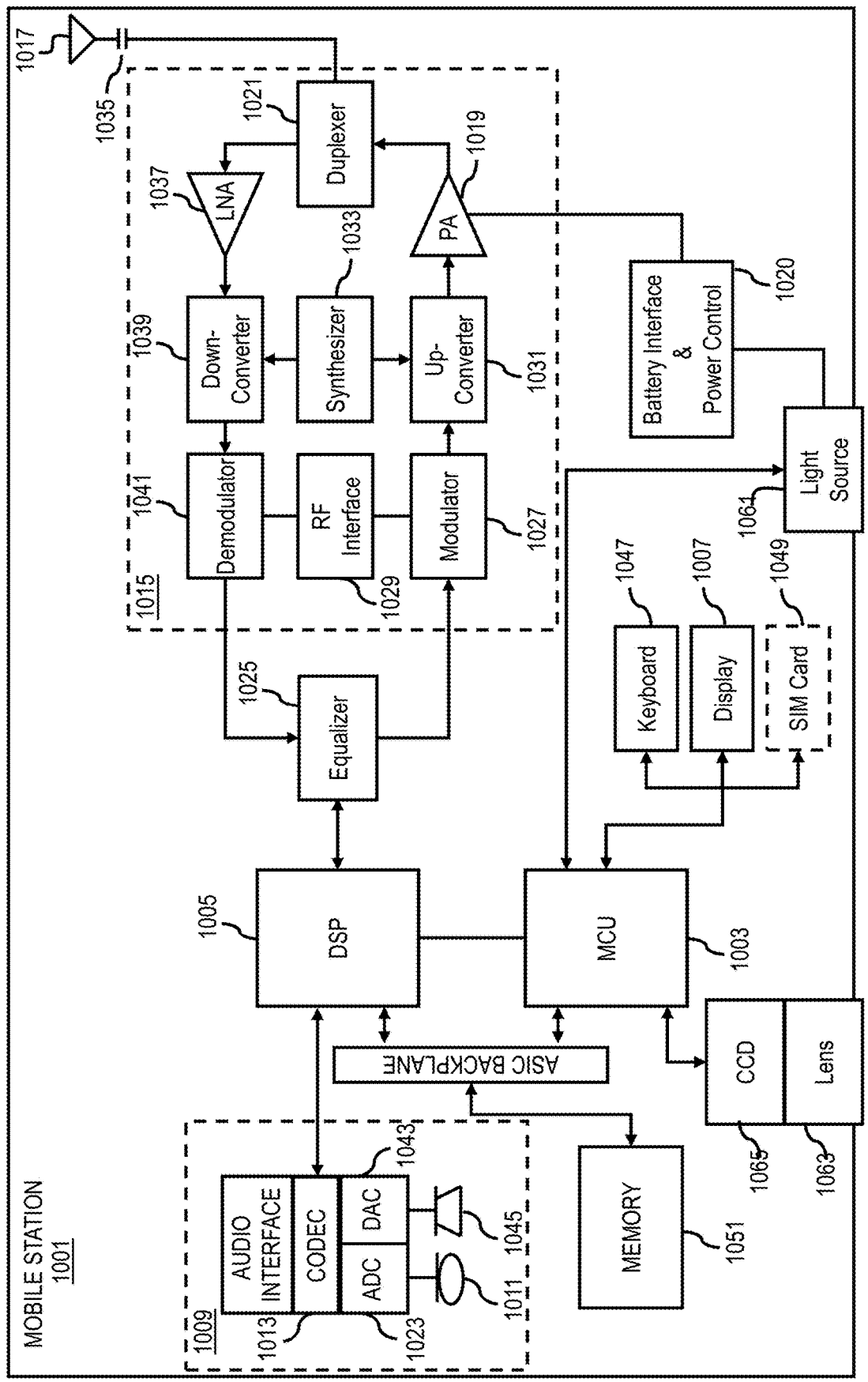
FIG. 10 is a diagram of example components of a mobile terminal (e.g., cell phone handset) for communications, which is capable of operating in the system, according to one embodiment.

FIG. 10 is a diagram of example components of a mobile terminal 1000 (e.g., cell phone handset) for communications, which is capable of operating in the system of FIG. 2C, according to one embodiment. In some embodiments, mobile terminal 1001, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps as described herein. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 as described herein. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

In some embodiments, the mobile terminal 1001 includes a digital camera comprising an array of optical detectors, such as charge coupled device (CCD) array 1065. The output of the array is image data that is transferred to the MCU for further processing or storage in the memory 1051 or both. In the illustrated embodiment, the light impinges on the optical array through a lens 1063, such as a pin-hole lens or a material lens made of an optical grade glass or plastic material. In the illustrated embodiment, the mobile terminal 1001 includes a light source 1061, such as a LED to illuminate a subject for capture by the optical array, e.g., CCD 1065. The light source is powered by the battery interface and power control module 1020 and controlled by the MCU 1003 based on instructions stored or loaded into the MCU 1003.

3. ALTERNATIVES, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

4. REFERENCES

The references cited in the Appendix are hereby incorporated by reference as if fully set forth herein, except for terminology inconsistent with that used herein.

[1] [n.d.]. Kafka. kafka.apache.org
[2] [n.d.]. Matplotlib. matplotlib.org
[3] [n.d.]. National Pressure Ulcer Advisory Panel (NPUAP) announces a change in terminology from pressure ulcer to pressure injury and updates the stages of pressure injury|The National Pressure Ulcer Advisory Panel—NPUAP. http://www.npuap.org/national-pressure-ulcer-advisory-panel-npuapannounces-a-change-in-terminology-from-pressure-ulcer-to-pressure-injuryand-updates-the-stages-of-pressure-injury/
[4] [n.d.]. NumPy. numpy.org
[5] [n.d.]. Python Client for Apache Kafka. https://github.com/confluentinc/confluent-kafka-python
[6] 2006. Eliminating serious, preventable, and costly medical errorsâĂŤnever events. Technical Report. Centers for Medicare & Medicaid Services.
[7] Karoon Agrawal and Neha Chauhan. 2012. Pressure ulcers: Back to the basics. Indian Journal of Plastic Surgery: Official Publication of the Association of Plastic Surgeons of India 45, 2 (2012), 244. https://www.ncbi.nlm.nih.gov/pmc/articles/PMC3495374/[8]
[8] Dan L. Bader and Peter R. Worsley. 2018. Technologies to monitor the health of loaded skin tissues. BioMedical Engineering OnLine 17 (April 2018), 40. https://doi.org/10.1186/s12938-018-0470-z
[9] Valentina Baljak, Adis Ljubovic, Jonathan Michel, Mason Montgomery, and Richard Salaway. 2018. A scalable realtime analytics pipeline and storage architecture for physiological monitoring big data. Smart Health 9-10 (December 2018), 275-286. https://doi.org/10.1016/j.smh1.2018.07.013
[10] Dan R Berlowitz and David M Brienza. 2007. Are all pressure ulcers the result of deep tissue injury? A review of the literature. Ostomy/Wound Management 53, 10 (2007), 34-38. http://www.o-wm.com/content/are-all-pressure-ulcers-resultdeep-tissue-injury-a-review-literature
[11] Holly N. Blackburn, Matthew T. Clark, J. Randall Moorman, Douglas E. Lake, and J. Forrest Calland. 2018. Identifying the low risk patient in surgical intensive and intermediate care units using continuous monitoring. Surgery 163, 4 (2018), 811-818.
[12] Aidan Curtis, Amruta Pai, Jian Cao, Nidal Moukaddam, and Ashutosh Sabharwal. 2019. HealthSense: Software-defined Mobile-based Clinical Trials. In The 25th Annual International Conference on Mobile Computing and Networking—MobiCom '19. ACM Press, Los Cabos, Mexico, 1-15. https://doi.org/10.1145/3300061.3345433
[13] Adam Dunkels, BjÃűrn GrÃűnvall, and Thiemo Voigt. 2004. Contiki-a lightweight and flexible operating system for tiny networked sensors. In Local Computer Networks, 2004. 29th Annual IEEE International Conference on. IEEE, 455-462.
[14] Lorenz Esch, Limin Sun, Viktor KlÃijber, Seok Lew, Daniel Baumgarten, P. Ellen Grant, Yoshio Okada, Jens Haueisen, Matti S. HÃd'mÃd'lÃd'inen, and Christoph Dinh. 2018. MNE Scan: Software for real-time processing of electrophysiological data. Journal of Neuroscience Methods 303 (June 2018), 55-67. https://doi.org/10.1016/j.jneumeth.2018.03.020
[15] Francisco Pedro GarcÃna-FernÃąndez, J. Agreda, JosÃl' VerdÃž, and Pedro L. Pancorbo-Hidalgo. 2014. A New Theoretical Model for the Development of Pressure Ulcers and Other Dependence-Related Lesions. Journal of Nursing Scholarship 46, 1 (2014), 28-38. http://onlinelibrary.wiley.com.oca.ucsc.edu/doi/10.1111/jnu.12051/full
[16] Gorecki Claudia, Brown Julia M., Nelson E. Andrea, Briggs Michelle, Schoonhoven Lisette, Dealey Carol, Defloor Tom, and Nixon Jane. 2009. Impact of Pressure Ulcers on Quality of Life in Older Patients: A Systematic Review. Journal of the American Geriatrics Society 57, 7 (June 2009), 1175-1183. https://doi.org/10.1111/j.1532-5415.2009.02307.x
[17] Lena Gunningberg and Cheryl Carli. 2016. Reduced pressure for fewer pressure ulcers: can real-time feedback of interface pressure optimise repositioning in bed? International Wound Journal 13, 5 (2016), 774-779.
[18] Lena Gunningberg, Inga-Maj Sedin, Sara Andersson, and Ronnie Pingel. 2017. Pressure mapping to prevent pressure ulcers in a hospital setting: A pragmatic randomised controlled trial. International Journal of Nursing Studies 72 (2017), 53-59.
[19] Hopkins Alison, Dealey Carol, Bale Sue, Defloor Tom, and Worboys Fran. 2006. Patient stories of living with a pressure ulcer. Journal of Advanced Nursing 56, 4 (September 2006), 345-353. https://doi.org/10.1111/j.1365-2648.2006.04007.x
[20] S. Mansfield, K. Obraczka, and S. Roy. 2019. Pressure Injury Prevention: A Survey. IEEE Reviews In Biomedical Engineering (2019), 1-3. https://doi.org/10.1109/RBME.2019.2927200
[21] Sam Mansfield, Sachin Rangarajan, Katia Obraczka, Hanmin Lee, David Young, and Shuvo Roy. 2019. Objective Pressure Injury Risk Assessment Using A Wearable Pressure Sensor. In 2019 IEEE International Conference on Bioinformatics and Biomedicine (BIBM). IEEE, San Diego, CA, USA, 1561-1568. https://doi.org/10.1109/BIBM47256.2019.8982939
[22] Jacob McPadden, Thomas J S Durant, Dustin R. Bunch, Andreas Coppi, Nathan Price, Kris Rodgerson, Charles J. Torre Jr, William Byron, H. Patrick Young, Allen L. Hsiao, Harlan M. Krumholz, andWade L. Schulz. 2018. AScalable Data Science Platform for Healthcare and Precision Medicine Research. arXiv:1808.04849 [cs] (August 2018), available in domain arxiv of superdomain org in folder abs in file 1808.04849.
[23] National Quality Forum (NQF). 2011. Serious Reportable Events in HealthcareâĂŤ2011 Update: A Consensus Report. Technical Report. NQF Washington, DC.
[24] Fredrik Osterlind, Adam Dunkels, Joakim Eriksson, Niclas Finne, and Thiemo Voigt. 2006. Cross-level sensor network simulation with cooja. In Local Computer Networks, Proceedings 2006 31st IEEE Conference on. IEEE, 641-648. http://ieeexplore.ieee.org/xpls/abs_all.jsp?arnumber=4116633
[25] David Pickham, Nic Berte, Mike Pihulic, Andre Valdez, Barbara Mayer, and Manisha Desai. 2018. Effect of a wearable patient sensor on care delivery for preventing pressure injuries in acutely ill adults: A pragmatic randomized clinical trial (LS-HAPI study). International Journal of Nursing Studies 80 (2018), 12-19.
[26] Gregory B Rehm, Brooks T Kuhn, Jean-Pierre Delplanque, Edward C Guo, Monica K Lieng, Jimmy Nguyen, Nicholas R Anderson, and Jason Y Adams. 2018. Development of a research-oriented system for collecting mechanical ventilator waveform data. Journal of the American Medical Informatics Association 25, 3 (March 2018), 295-299. https://doi.org/10.1093/jamia/ocx116

[27] Anna Rodriguez, Peter Smielewski, Eric Rosenthal, and Dick Moberg. 2018. Medical Device Connectivity Challenges Outline the Technical Requirements and Standards For Promoting Big Data Research and Personalized Medicine in Neurocritical Care. Military Medicine 183, suppl_1 (March 2018), 99-104.https://doi.org/10.1093/milmed/usx146

[28] C. Allison Russo, Claudia Steiner, and William Spector. 2006. Hospitalizations related to pressure ulcers among adults 18 years and older, 2006: statistical brief #64. (2006).

[29] Sarah L Swisher, Monica C Lin, Amy Liao, Elisabeth J Leeflang, Yasser Khan, Felippe J Pavinatto, Kaylee Mann, Agne Naujokas, David Young, Shuvo Roy, and others. 2015. Impedance sensing device enables early detection of pressure ulcers in vivo. Nature Communications 6 (2015), ncomms7575.

[30] Farid Touati, Adel Ben Mnaouer, Ochirkhand ErdeneâĂŘOchir,Waiser Mehmood, Ammad Hassan, and Brahim Gaabab. 2016. Feasibility and performance evaluation of a 6LoWPAN-enabled platform for ubiquitous healthcare monitoring. Wireless Communications and Mobile Computing 16, 10 (2016), 1271-1281. https://doi.org/10.1002/wcm.2601

[31] Catherine VanGilder, Charlie Lachenbruch, Corrine Algrim-Boyle, and Stephanie Meyer. 2017. The International Pressure Ulcer PrevalenceâDć Survey: 2006-2015. Journal of Wound, Ostomy and Continence Nursing 44, 1 (2017), 20-28.

What is claimed is:

1. A system for measuring patient condition comprising:
a plurality of sensors for collecting measurements suitable for a condition of a patient, with the collected measurements being reported as native samples using native interactions associated with a sensor type of each of the plurality of the sensors, the plurality of sensors having more than one sensor types;
a display device configured to be viewed by a caregiver for the patient;
at least one processor; and
at least one memory including one or more sequences of instructions, the at least one memory and the one or more sequences of instructions configured to, with the at least one processor, provide:
a sensing module configured to:
access generic sensor commands, the generic sensor commands being independent of the native interactions for each sensor type;
translate the generic sensor commands into the native interactions understood by a corresponding sensor type of each of the plurality of sensors;
transmit the native interactions to each of the plurality of sensors based on the sensor types of the plurality of sensors;
determining an actual maximum throughput for each of the plurality of sensors by operating the each of the plurality of sensors at a corresponding maximum sampling rate;
setting a down-sampling factor for the each sensor based on a throughput of the analysis module and the actual maximum throughput of the each sensor;
receive, from the plurality of sensors, the native samples that indicate the collected measurements;
reformat the received native samples into generic sample data packets comprising basic fields holding sample data indicating sample type, patient identifier, device identifier, timestamp, and sample value; and
store the generic sample data packets in a local buffer,
a storage module configured to receive from the sensing module the generic sample data packets;
an analysis module configured to determine metrics based on the sample values in the generic sample data packets, and to store into metric data structures metric data indicating metric type, patient identifier, device identifier, time stamp, and metric value; and
a visualization module configured to present the metrics on the display device.

2. The system of claim 1, wherein the sensing module is further configured to:
adjust a size of the local buffer based on throughputs of the plurality of sensors.

3. The system of claim 1, wherein:
the generic sensor commands include commands to start sensing, stop sensing, operate in a particular range, operate at a particular sampling rate, and test maximum sampling rate; and
the sensing module is configured to translate each generic sensor command into corresponding native interactions based on the sensor type of each sensor.

4. The system of claim 1, wherein the storage module is configured to:
process the generic sample data packets with an adaptively adjustable batch size.

5. The system of claim 4, wherein the storage module is configured to adaptively adjust the batch size by operations comprising:
configuring a fixed timeout period;
in response to determining that a timeout occurs before processing a current batch, reducing the batch size; and
in response to determining that the current batch is processed before the timeout occurs, increasing the batch size.

6. The system of claim 1, wherein the analysis module is configured to:
monitor an end-to-end latency from when measurements are collected by the plurality of sensors to when the metrics are visualized on the display device; and
maintain the end-to-end latency below a predetermined threshold.

* * * * *